United States Patent [19]

Ballard et al.

[11] 4,298,985

[45] Nov. 3, 1981

[54] DIGITAL FILTER BANK DETECTOR

[75] Inventors: Arthur H. Ballard, Bethesda, Md.; Theodore J. Klein, Atlantic Highlands, N.J.

[73] Assignee: The United States of America as represented by the Secretary of the Army, Washington, D.C.

[21] Appl. No.: 108,903

[22] Filed: Dec. 31, 1979

[51] Int. Cl.³ .............................................. H03D 7/00
[52] U.S. Cl. ...................................... 375/82; 375/88; 375/96; 375/103; 364/485
[58] Field of Search ....................... 370/19, 20, 21, 22, 370/23; 375/62, 67, 83, 88, 96, 103, 80, 82; 364/484, 485, 486, 572, 576, 724, 725, 726, 514, 581; 324/78 F, 78 D; 343/55 A, 5 DP

[56] References Cited

U.S. PATENT DOCUMENTS

| | | | |
|---|---|---|---|
| 3,544,894 | 12/1970 | Hartwell | 364/485 |
| 3,863,055 | 1/1975 | Colin | 364/726 |
| 3,883,724 | 5/1975 | Schmidt | 364/726 |
| 4,054,785 | 10/1977 | Lehmann | 364/726 |
| 4,058,713 | 11/1977 | DiToro | 364/724 |
| 4,075,630 | 2/1978 | Shapiro | 343/5 DP |
| 4,090,242 | 5/1978 | Lerma | 364/484 |

Primary Examiner—Benedict V. Safourek
Assistant Examiner—Stephen Chin
Attorney, Agent, or Firm—Nathan Edelberg; Jeremiah G. Murray; Michael C. Sachs

[57] ABSTRACT

Disclosed is a signal detector including a bank of digitally synthesized narrowband filters all having the same shape of frequency response and differing only in center frequency and which are implemented by time domain data processing. The invention is comprised of: a signal conditioner, an envelope weighting computer, a Fourier transform processor and a post-detection processor. Resulting therefrom is a bank of 16 contiguous narrowband filters having high selectivity along with a corresponding bank of envelope detectors of wide dynamic range which incorporates center frequency acquisition and tracking. Following detection, a matched filter capability is included to provide correlation and data regeneration so that coded FSK data burst signals can be extracted in real time from noise, interference, and jamming signals which would otherwise affect signal detection.

10 Claims, 10 Drawing Figures

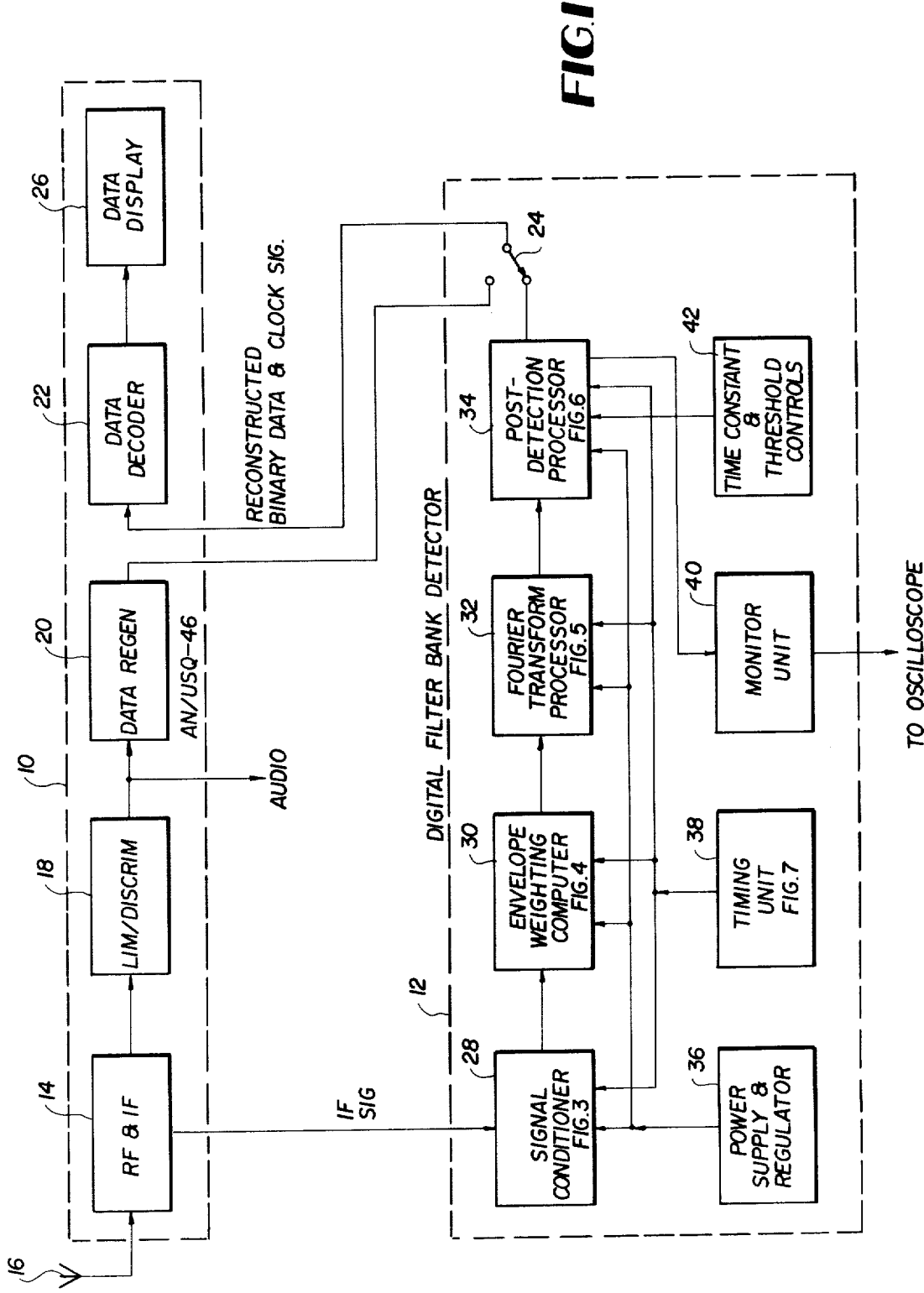

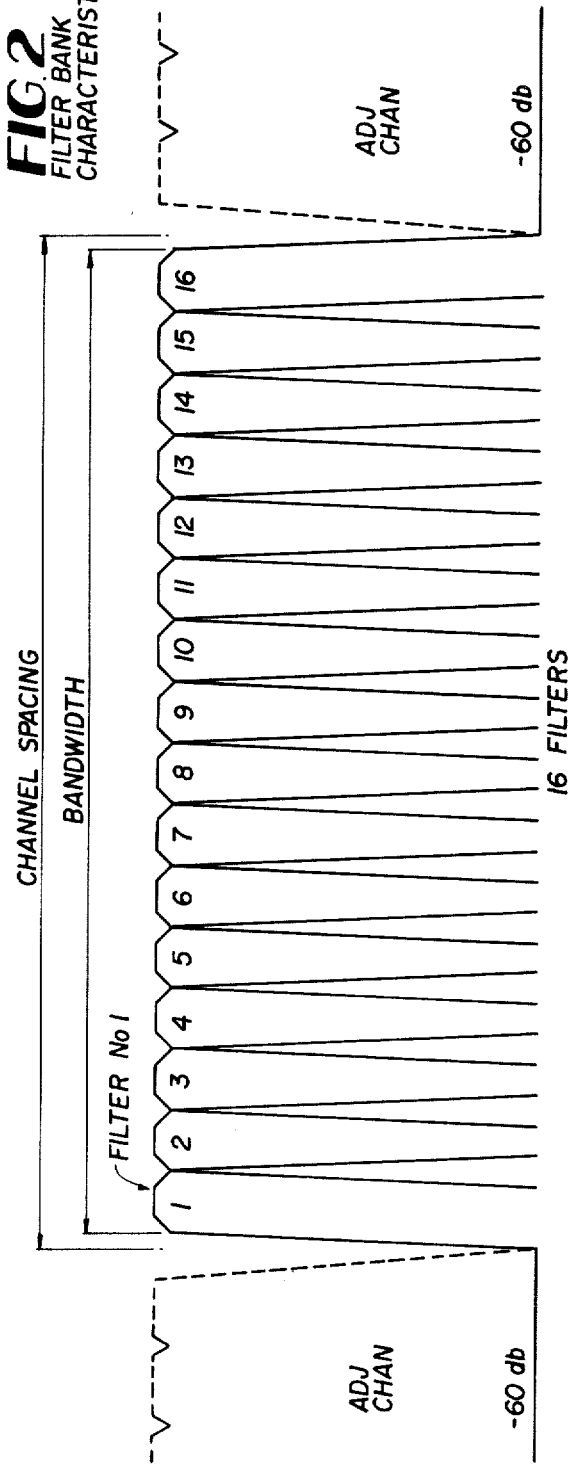
FIG.2 FILTER BANK CHARACTERISTIC
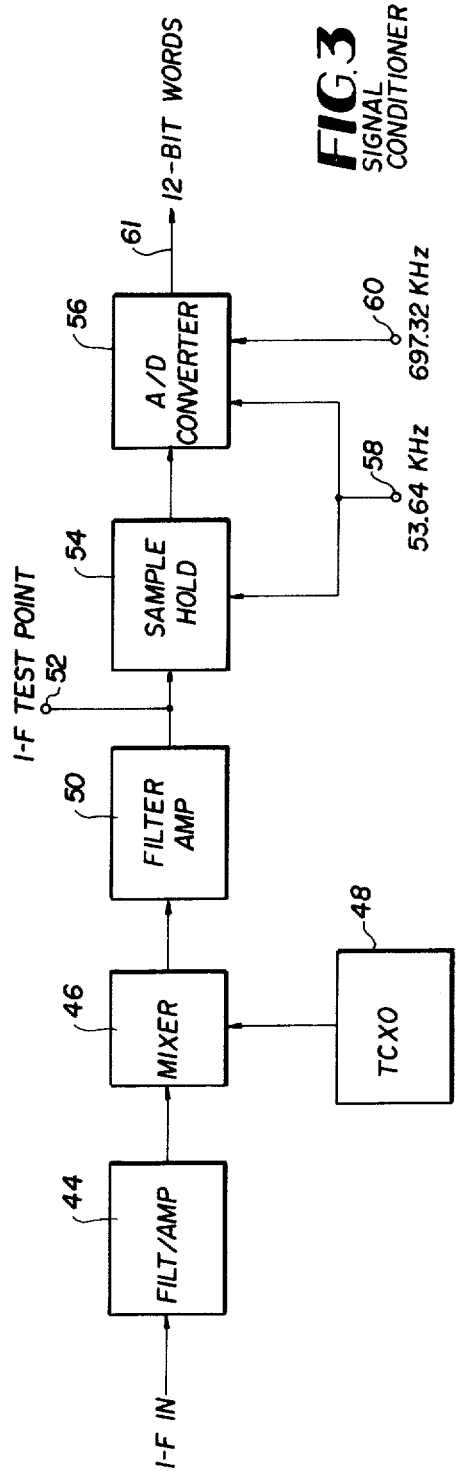
FIG.3 SIGNAL CONDITIONER

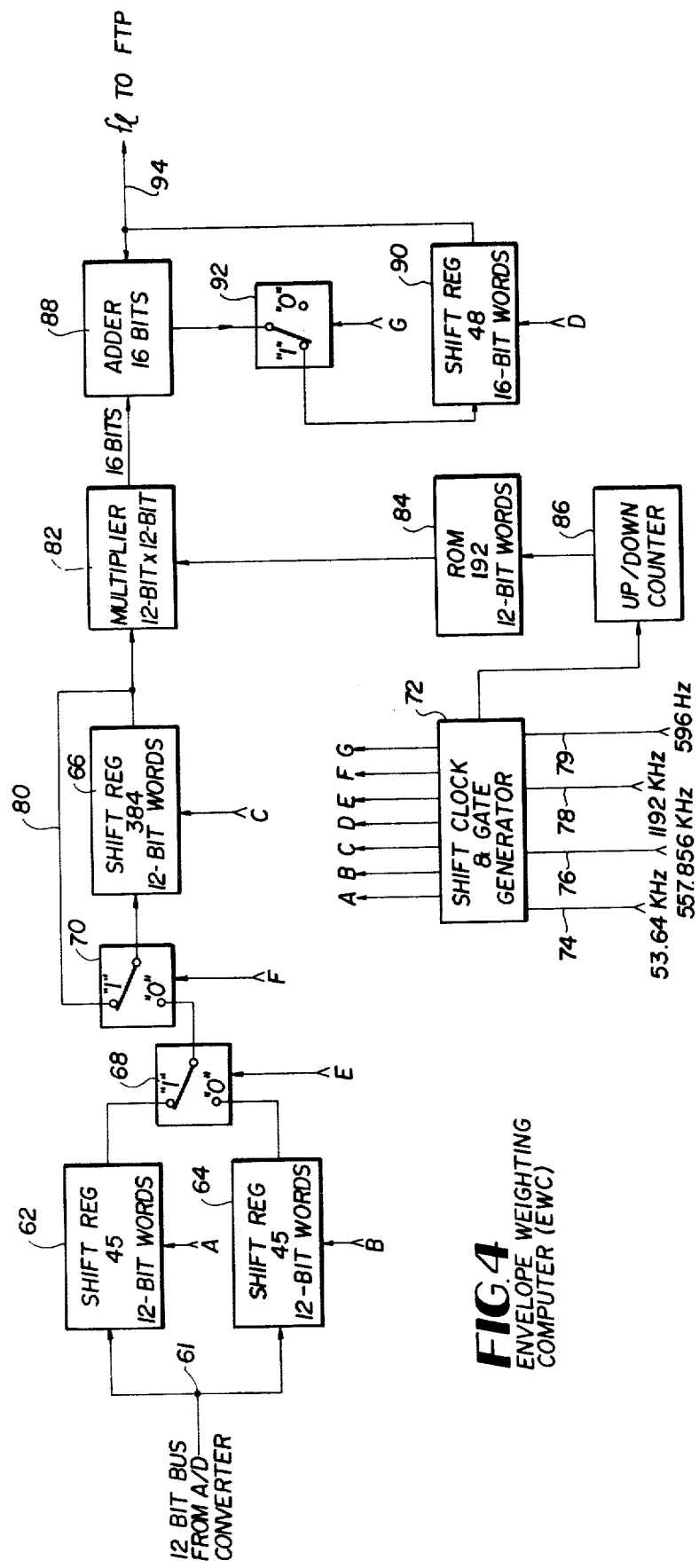
FIG.4 ENVELOPE WEIGHTING COMPUTER (EWC)

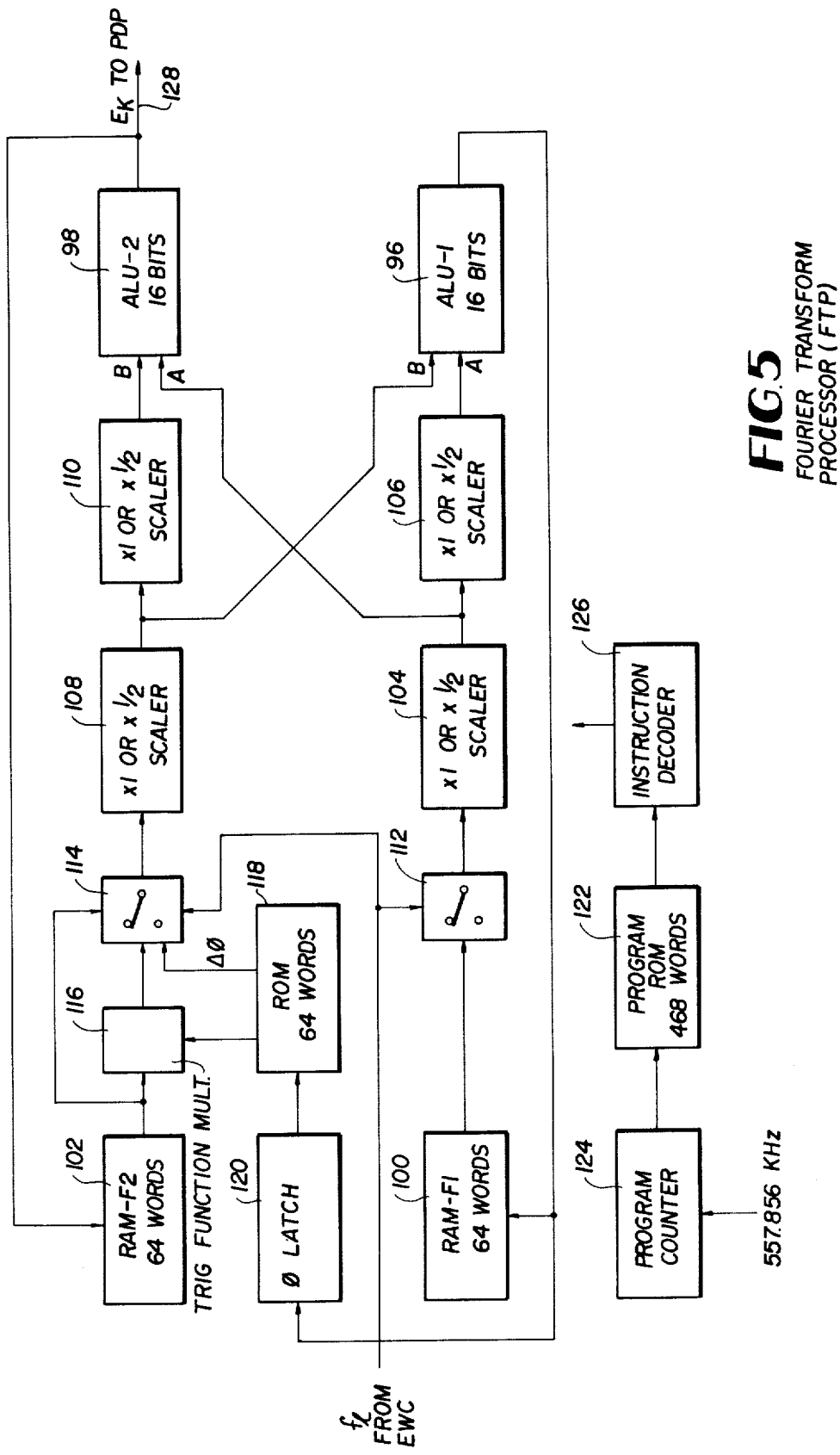
FIG.5 FOURIER TRANSFORM PROCESSOR (FTP)

POST DETECTION PROCESSOR (PDP)

TIMING UNIT

48-POINT MODIFIED FFT
FLOW DIAGRAM

ENVELOPE DETECTOR ALGORITHM FLOW DIAGRAM

PDP PROGRAM CYCLE

DIGITAL FILTER BANK DETECTOR

The invention described herein may be manufactured and used by or for the Government for governmental purposes without the payment of any royalties thereon or therefor.

BACKGROUND OF THE INVENTION

This invention relates generally to electrical signal filtering apparatus and more particularly to a digital filter bank for processing IF signals developed in a radio receiver for recovering coded FSK data burst signals whose center frequency drift is large compared to their bandwidth.

SUMMARY

Briefly, the subject invention is included in a frequency shift keying FSK radio receiver and comprises a digitally synthesized filter bank detector including a plurality of contiguous narrowband filters. Employed are means for implementing a signal conditioner, an envelope weighting computer, a Fourier transform processor and a post-detection processor. The signal conditioner is adapted to convert an IF signal to a sequence of multi-bit digital words at a relatively high sampling rate. The digital words or samples are then processed by the envelope weighting computer and the Fourier transform processor, in combination, to synthesize the digital filter bank. The envelope weighting computer establishes the filter shape, while the Fourier transform processor establishes the center frequency for the plurality of contiguous narrowband filters and computes the envelope amplitude of the samples at each frequency. The post-detection processor is adapted to provide clipping and threshold logic for each of the filters, search/track logic to identify a valid FSK filter pair and demodulation and data regeneration logic for regenerating the received message signals.

BRIEF DESCRIPTION OF THE DRAWINGS

FIG. 1 is an electrical block diagram broadly illustrative of the preferred embodiment of the subject invention;

FIG. 2 is a diagram illustrative of a bank of 16 contiguous filters digitally synthesized by the subject invention;

FIG. 3 is an electrical block diagram illustrative of the signal conditioner portion of the digital filter bank detector shown in FIG. 1;

FIG. 4 is an electrical block diagram illustrative of the envelope weighting computer portion of the detector shown in FIG. 1;

FIG. 5 is an electrical block diagram illustrative of the Fourier transform processor portion of the detector shown in FIG. 1;

DESCRIPTION OF THE PREFERRED EMBODIMENT

Figure 6:
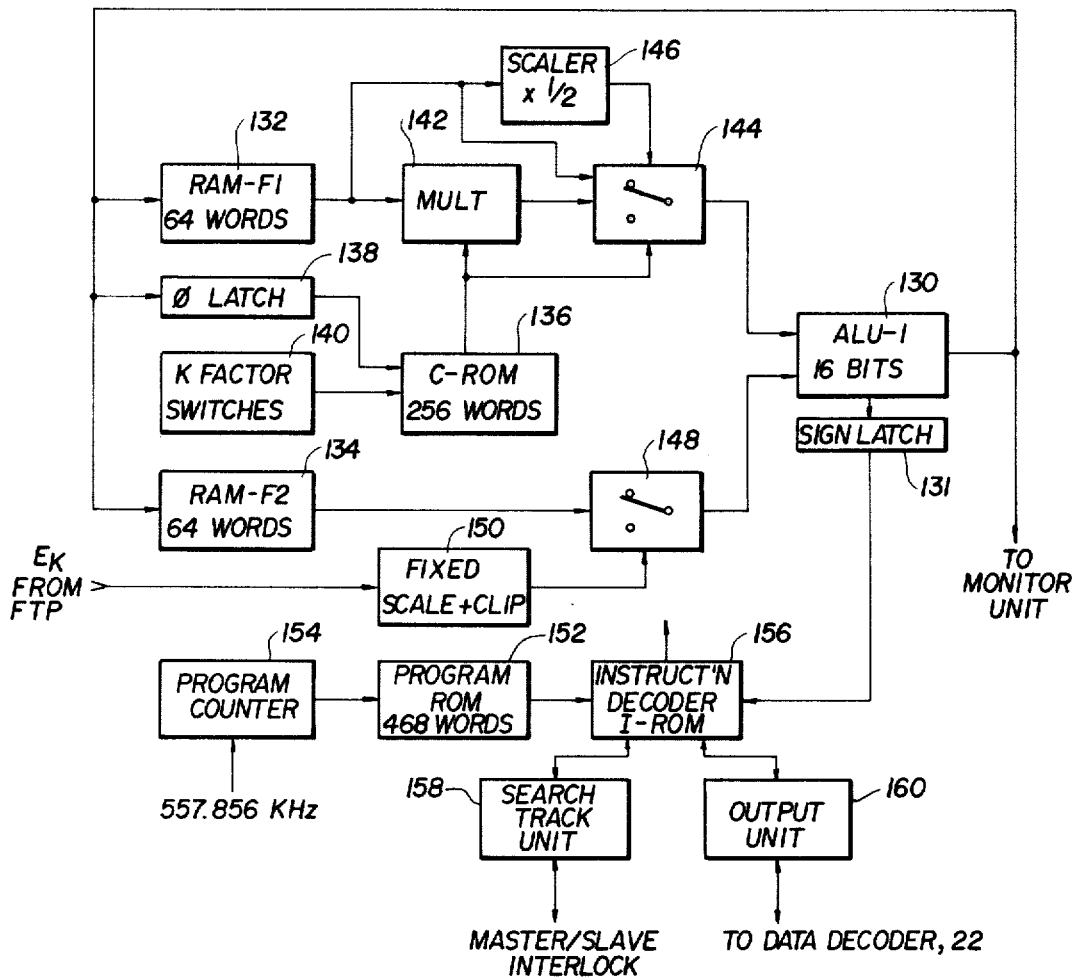
FIG. 6 is an electrical block diagram illustrative of the post-detection processor portion of the detector shown in FIG. 1.

Referring now to the drawings wherein like reference numerals refer to like elements throughout, reference is first made to FIG. 1 wherein reference numeral 10 designates a radio receiver which is adapted to receive coded frequency shift keying (FSK) data burst signals (at a message rate of 300 bits per second, for example) whose center frequency drift is large (plus or minus 5 filter spacings in FIG. 2, for example) compared to their bandwidth (frequency shift of plus or minus 2 to 3 filter spacings) and extract these signals in real time from co-channel noise, interference or jamming signals utilizing a digital filter bank detector 12, which is the subject matter of the present invention. The digital filter bank detector 12 is particularly adapted to improve the performance of a military radio receiver, a typical example being an AN/USQ-46 RF monitor set. The receiver 10 is shown including a front-end section 14 which is coupled to an RF antenna 16 and adapted to provide an IF signal. The IF signal which may be, for example, a signal whose center frequency is in the region of 21.4 MHz and having a bandwidth of for example 20 KHz is fed to the filter bank detector 12 as well as a limiter/discriminator section 18, which is adapted to provide an audio output. The output of the limiter/discriminator section 18 is additionally fed to a data regenerator section 20, which is adapted to feed into a data decoder section 22 through electronic switch device 24 which is also coupled to the detector 12. The output of the data decoder is coupled to a data display device 26 and operates in a fashion well known to those skilled in the art.

As shown in FIG. 1, the digital filter bank detector 12 is comprised of four major portions or sub-sections. A signal conditioner 28 is included which acts to convert a 20 KHz bandwidth IF signal centered at 21.4 MHz to a sequence of 12-bit digital words at a sampling rate exactly equal to 48 times the filter spacing in FIG. 2, for example a sampling of 53.6 KHz for filters spaced 1117.5 Hz apart in center frequency. Next an envelope weighting computer 30 is provided which accepts the digital word samples and establishes the filter shape of 16 contiguous narrowband filters as shown in FIG. 2 and acts in combination with a Fourier transform processor 32 which operates to establish 16 mutually equally spaced center frequencies and computes envelope amplitudes at each frequency. The Fourier transform processor 32 acts in concert with the envelope weighting computer 30 to process the digital samples and synthesize a digital filter bank. Lastly a post-detection processor 34 is also included in the filter bank detector 12 which incorporates adaptive clipping and threshold logic to identify a valid FSK filter pair and demodulation and data regeneration data logic for regenerating received message signals in the form of reconstructed binary data and clock signals which are fed via a mode switch 24 to the data decoder 22.

The detector 12 also incorporates a regulated power supply 36, a timing unit 38 which is adapted to provide the necessary clock signals required to synchronize operation of the signal processing means 28, 30, 32 and 34, a monitor unit 40 and a front panel control sub-section 42.

Considering now the details of the filter bank detector 12, reference is now made to FIG. 3 where there is shown in block diagram form the details of the signal conditioner sub-section 28. The IF signal from the front-end section 14 of the receiver 10 is fed into a crystal filter and amplifier circuit 44 which provides selective bandpass amplification and filtering of the IF input signal which is then coupled to a balanced mixer 46 which is also coupled to a temperature-compensated crystal oscillator (TCXO) 48. The mixer 46 operates to translate the IF center frequency downward from 21.4 MHz to a second IF center frequency of, for example, 40.8 KHz. This new IF signal is fed to the filter-amplifier 50 including a 12-pole passive filter, not shown, which is used to control aliasing in the sampling process which is to follow. At this point an IF text point 52 is also provided.

The 40.8 KHz IF signal is next quantized in time and amplitude by means of a sample-and-hold circuit 54 which is adapted to provide time quantizing and an analog to digital (A/D) converter 56 which is adapted to provide amplitude quantizing. A first clock signal (53.64 KHz) is coupled to both the sample-and-hold circuit 54 and the A/D converter 56 via terminal point 58 shown in FIG. 3. A second clock signal (697.32 KHz) is additionally applid to the A/D converter 56 via terminal 60. The first clock signal determines the sampling rate, while the second clock signal is adapted to generate a 12-bit binary number by the method of successive approximation. The output of the A/D converter comprises an offset binary code (all 0's = minus full scale, all 1's = plus full scale) which is then changed to 2's complement notation by inversion of the most significant (sign) bit.

Proceeding now to FIG. 4, the 12-bit words from the A/D converter 56 are fed via data bus 61 to the envelope weighting computer 30 (FIG. 1) where the most recent 384 words are processed in each frame, the processing frame rate being chosen very nearly four times faster than the message bit rate (for example, a frame rate of 1192 Hz representing the sampling rate of 53.64 KHz divided by a factor of 45, for a nominal message bit rate of 300 bits per second.) In particular, the 12-bit words from the A/D converter are fed to a dual $45 \times 12$ word input buffer consisting of shift registers 62 and 64. A $384 \times 12$ word recirculating shift register 66 is coupled to the shift registers 62 and 64 by means of 12 pole electronic switching devices which are shown schematically and identified by reference numerals 68 and 70. The 12-bit data words received from the A/D converter 56 at a 53.64 KHz sampling rate are loaded into register 62 during every other frame and into register 64 during the intervening frames. While register 62 is being used to store 45 new data samples, register 64 is used to update the recirculating shift register 66. The shift registers 62, 64 and 66 and switching devices 68 and 70 are controlled by the outputs from a shift clock and gate generator circuit 72 which receives a 53.64 KHz, a 557.856 KHz, a 1192 Hz and a 596 Hz clock signal from the timing unit shown in FIG. 7 via circuit leads 74, 76, 78 and 79 respectively. Outputs from the generator 72 are coupled to various elements via signal leads having the alphabetical designations A . . . G as shown in FIG. 4.

Updating of shift register 66 in one frame is achieved by applying high speed (557.856 KHz) shift pulses to register 64 via B and setting electronic switches 68 and 70 to their respective "0" position. The next 45 words representing new input data are transferred from register 64 to register 66 by the simultaneous application of pulses at a 557.856 KHz rate on leads B and C. At the same time, the oldest 45 words previously held in shift register 66 are discarded. After 45 shift pulses have occurred, switch 70 is activated to its "1" position by a signal coupled thereto via line F and further outputs from the register 64 are ignored. During the next frame register 62 will be used to update shift register 66. Updating from register 62 occurs in the same manner described except that switch 68 will be in its "1" position in response to a signal applied thereto via circuit lead E.

After the shift register 66 has been updated at the beginning of each frame i.e. 45 of the first 48 pulses, its output words are circulated back into its input via bus 80 and switch 70 for the next 384 high speed (557.856 KHz) shift pulses thereby effecting a time compression of 10.4/1 on the 53.64 KHz words from the A/D converter. As the 12-bit words are recirculated, they are applied to one input of a $12 \times 12$ digital multiplier circuit 82 where the word samples are multiplied by a time-domain weighting function $e_i$ obtained from a ready-only memory 84 which has predetermined constant weighting coefficients stored therein. The weighting coefficients approximate an ideal sinx/x pattern where the width of the main lobe corresponds roughly to one half of a message bit interval. Because the weighting coefficients $e_i$ are symmetrical about their midpoint, only 192 samples are stored in the ROM 84 and they are read out first with an increasing address and then with a decreasing address under the control of an up/down counter 86. The multiplier 82 is designed to preserve the 16 most significant bits of the full 24-bit product which normally results from multiplying two 12-bit numbers. The multiplier output accordingly comprises truncated 16-bit words which are applied to an output accumulator consisting of a 16-bit adder 88, a 48-word shift register 90, and a 16-bit electronic switch 92 which is operated by a signal applied via lead G. The shift register 90 is operated in accordance with a signal applied from the generator 72 via lead D.

The register 90 is used as an accumulator memory for computed output data to take advantage of the fact that all of the center frequency weighting functions used in the Fourier transform processor 32 are repetitive every 48 samples. During the first 48 high speed 557.856 KHz clock pulses, register 90 is cleared by shifting out the previously computed 48 data words to a 16-bit data bus 94. Register 90 is disconnected from the adder during this time by placing the switch 92 in its "0" position in response to a control signal on lead G. During the next 384 recirculation clock pulses, the input to shift register 90 is reconnected to the sum output of the adder 88. The two 16-bit inputs to the adder 88 are the multiplier product output and the delayed output from register 90. As each multiplier output word is computed, it is added to the previous sum of products stored 48 pulses earlier in register 90. Each of the 48 words in register 90 is accumulated eight times during the 384 recirculation shifts of register 66.

During the last 36 of the 468 high speed clock pulses in each frame, the envelope weighting computer is idle except for the input register 62 or 64 which is loading new data at the 53.64 KHz shift rate. Shift register 90, on the other hand, retains the computed 48 output words during the idle period which are then transferred as the signal samples $f_i$ on data bus 94 to the Fourier transform processor 32 in the beginning of the next data frame. This operation thus digitally synthesizes the time-domain envelope response of a plurality (16) of identical filters all having the same shape or frequency response, differing only in center frequency. Weighting by 16 different center frequency functions is accomplished in the Fourier transform processor 32 now to be described.

Referring now to FIG. 5, there is shown in block diagrammatic form a bus-oriented digital Fourier transform processor (FTP) having a dual arithmetic capability. Essentially the FTP processor 32 (FIG. 1) is comprised of two 16-bit arithmetic logic units 96 (ALU-1) and 98 (ALU-2) which are selectively coupled in accordance with a stored program to two 16-bit data word random access memories (RAM) 100 (F1) and 102 (F2) through scaler means (multipliers X1 or X½) 104, 106 and 108, 110. Additionally, multi-bit electronic switches 112 and 114 interconnect the RAMs 100 and 102 to the scalers 104 and 108. Also, a multiplier (x) circuit 116 is connected between the RAM 102 and the switch 114. The multiplier 116 is adapted to receive inputs from a read-only memory (ROM) 118 which is programmed with trigonometric coefficients or weighting factors which are outputted either indirectly in response to a phase latch circuit 120, or directly in response to a program instruction decoder 126.

A stored operational program is contained in a 468-word programmable ROM 122 indexed by means of a program counter 124. A program decoder 126 is coupled to the ROM 122 and is operable to address specific memory locations in RAM 100, RAM 102 and ROM 118, and also to effect predetermined interconnection of the elements shown in FIG. 5 to provide 36 different circuit configurations for implementing 36 different instructions which are defined in Appendix 1A and used in accordance with the program specified in the FTP program list outlined in Appendix 1B. The specific circuit configurations for the elements of FIG. 5 for each instruction type are shown in Appendix 1C. Appendices 1A, 1B, and 1C are attached to and form a part of the detailed specification.

The program outlined in Appendix 1B is adapted to perform operations equivalent to the following computations:

$$I_k = \frac{1}{32} \sum_{l=0}^{47} f_l \cos \frac{2\pi kl}{48} \quad (1)$$

where $I_k$ is the in-phase component at frequency k $$Q_k = \frac{1}{32} \sum_{l=0}^{47} f_l \sin \frac{2\pi kl}{48} \quad (2)$$

where $Q_k$ is the quadrature-phase component at frequency k, $$\phi_k \doteq \tan^{-1}(Q_k/I_k) \quad (3)$$

where $\phi_k$ is an estimate of the true phase angle at frequency k, and $$E_k = I_k \cos \phi k + Q_k \sin \phi_k \quad (4)$$

where $E_k$ is the envelope amplitude at frequency k. In equations (1), (2), (3), and (4), the frequency index k takes on the values from 4 to 19 in synthesizing a bank of 16 contiguous filters covering, for example, a passband of 3.8–21.8 KHz if the sampling rate is 53.64 KHz.

Figure 8:
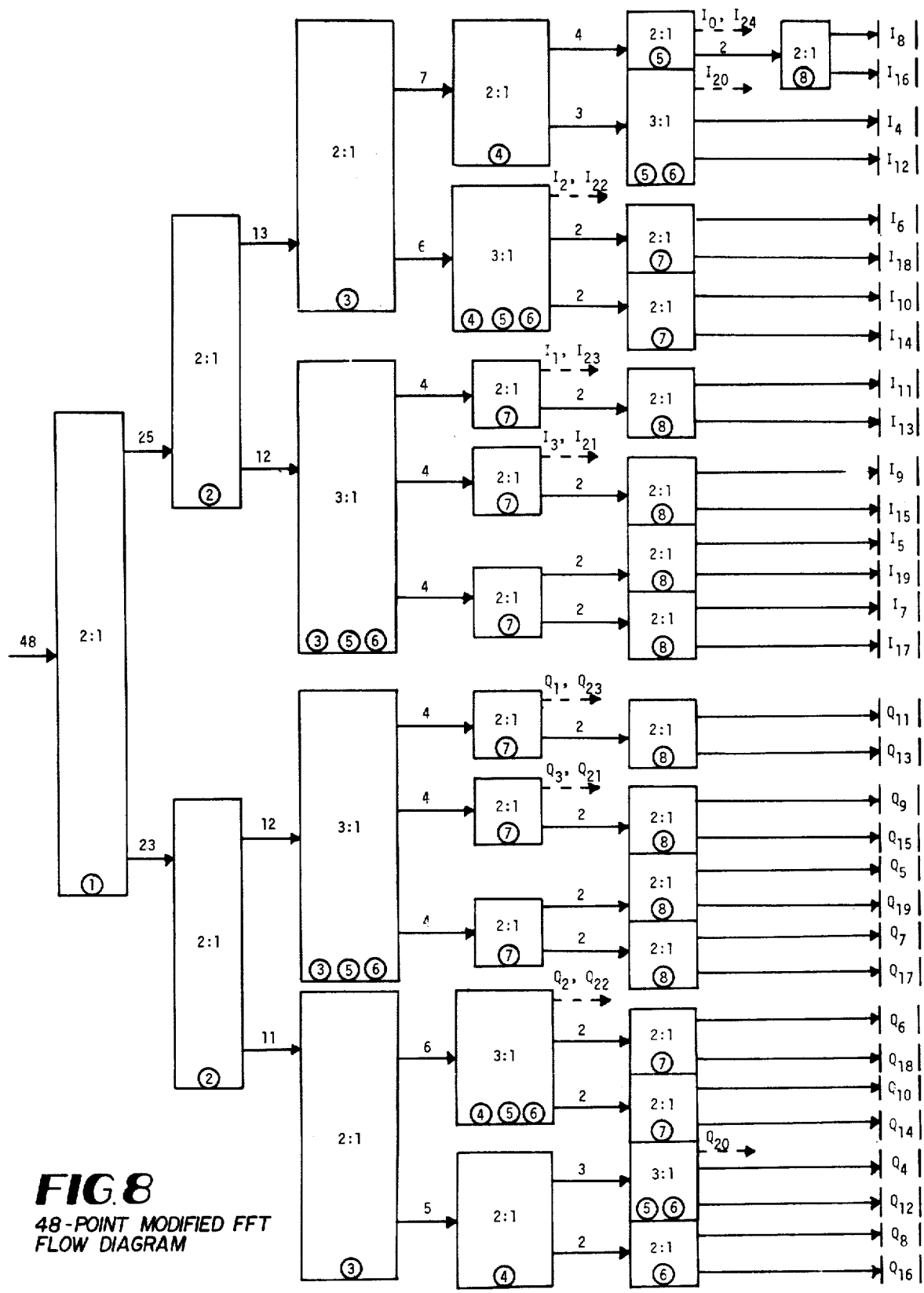
FIG. 8 is a diagram illustrative of the modified fast Fourier transform algorithm performed by the Fourier transform processor shown in FIG. 5.

The $I_k$ and $Q_k$ values are computed using a 48-point modified fast Fourier transform (FFT) algorithm. The modified algorithm employed differs from a conventional FFT algorithm in the following respects: (a) the modified algorithm contains 3:1 transformations as well as 2:1 transformations; (b) because only 32 outputs are required ($I_k$ and $Q_k$ values for each filter), the operations needed to produce the remaining 16 outputs of a full 48-point transform are omitted; (c) the sequence of operations performed is designed to minimize the number of irrational multiplications (by factors other than 0, ±½, or ±1) and also to minimize the number of irrational multiplying factors; and (d) an absolute value computation is computed on the last step in which each $I_k$ or $Q_k$ output value is produced. A simplified flow diagram for the 48-point modified FFT algorithm is shown in FIG. 8. The computations consist of 2:1 and 3:1 transformations designed to produce intermediate combinations of input data associated with progressively smaller groups of output data. The FFT algorithm is computed in eight stages, i.e. eight passes through the 48 stored data words. The circled numbers in FIG. 8 indicate the stages during which each 2:1 or 3:1 transformation is accomplished. As is well known, each basic step combines data samples in pairs. A new pair of data samples is obtained as a weighted sum and a weighted difference of the original pair of samples. At the end of each step the original pair of samples is discarded and the new pair of samples is stored in their place. The envelope amplitude $E_k$ for each narrowband filter is next computed in the processor shown in FIG. 5 by means of a successive phase algorithm. This indirect method of computing $E_k$ makes more efficient use of the dynamic range available in a 16-bit digital processor than the more direct method of taking the square root of the sum of the squares. The phase approximation algorithm is based on the trigonometric formula given in equation (3), which can be restated in the form:

$$|I_k| \tan \phi_k - |Q_k| = 0, \text{ if } \phi_k = 0° \text{ to } 45° \quad (5a)$$

$$|Q_k| \tan (90° - \phi_k) - |I_k| = 0, \text{ if } \phi_k = 45° \text{ to } 90° \quad (5b)$$

Figure 9:
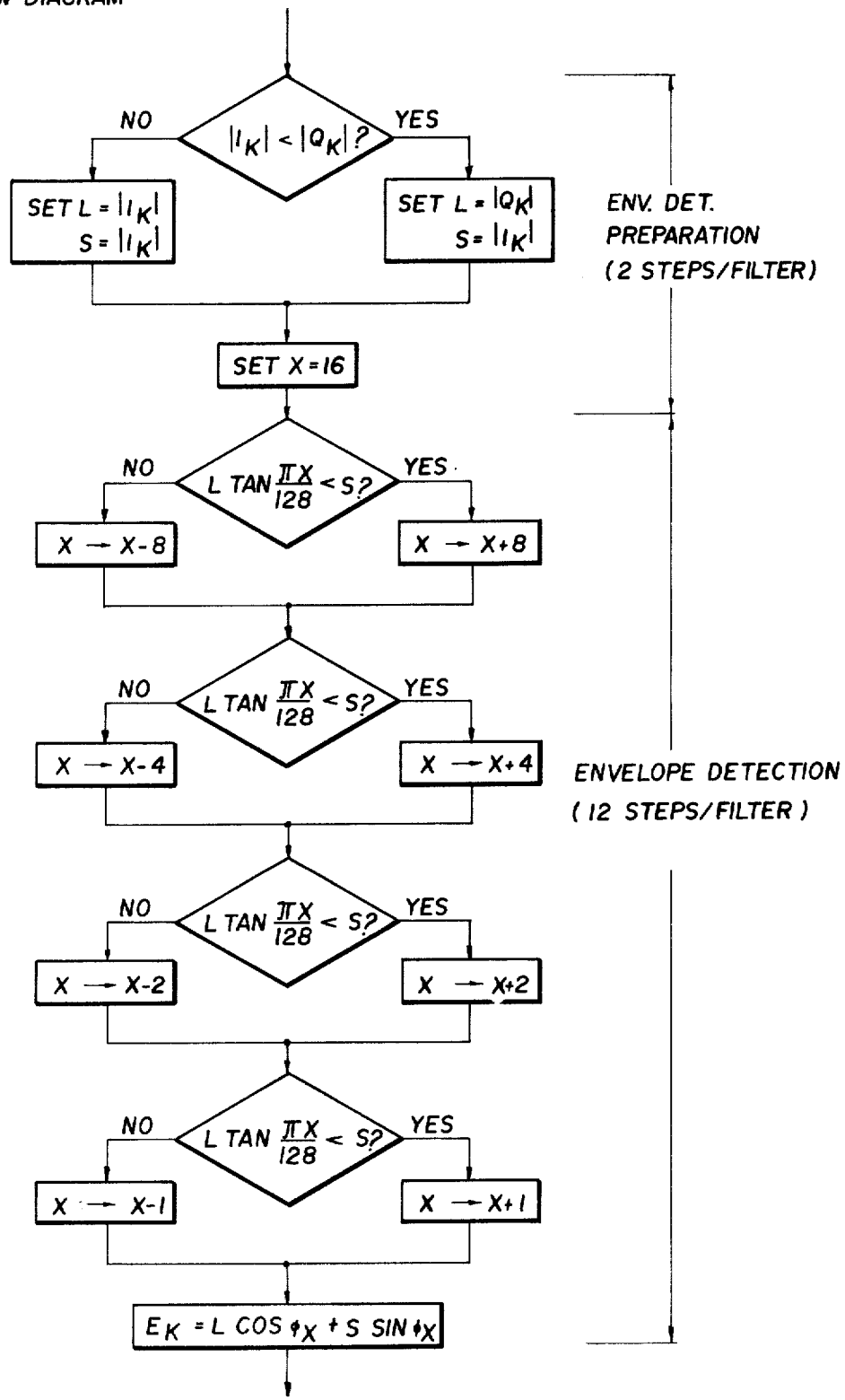
FIG. 9 is a flow chart of the envelope detector algorithm performed in the Fourier transform processor of FIG. 5.

A flow diagram of the envelope detector algorithm is illustrated in FIG. 9. By taking the absolute magnitudes $|K_k|$ and $|Q_k|$ the possible values of $\phi_k$ are initially restricted to the range 0° to 90°. The magnitudes $|I_k|$ and $|Q_k|$ are then interchanged if necessary to further restrict $\phi_k$ to the range 0° to 45°. A trial value in the middle of this range (22.5°) is then used as the first approximation for $\phi_k$. Depending on the polarity of the result from equation (5a), $\phi_k$ is then either increased or decreased by 11.25°. The same process is repeated using successively smaller corrections to $\phi_k$ until a final value is obtained which is accurate to within ±0.7°. The envelope amplitude $E_k$ is then computed using equation (4). Each $E_k$ envelope sample is outputted from the Fourier transform processor on data bus 128 (FIG. 5) on the twelfth step of sixteen 12-step cycles occurring between steps 263 and 454 of the program as shown in Appendix 1B.

The sixteen $E_k$ samples are fed to the post-detection processor 34 (FIG. 1) which implements an adaptive threshold function, a search/track function, and a data regeneration of the message signals in digital form. The details of the post-detection processor are shown in FIG. 6 and include a single arithmetic logic unit 130 (ALU-1) intercoupled with a pair of random access memories 132 (F1) and 134 (F2) in a manner similar to the Fourier transform processor (FIG. 5). It also includes a table look-up ROM 136 containing predetermined numerical constants which is controlled either indirectly by a phase angle latch 138 or a K factor switch section 140, or directly by an instruction decoder 156. The ROM 136 couples to multiplier 142 along with the output of the RAM 132. The output of the RAM 132 is coupled to the arithmetic logic unit 130 by means of a multi-pole electronic switch 144 either directly or through the multiplier 142 or through a scaler (X$\frac{1}{2}$) circuit 146. The switch 144 is also adapted to connect the input of the arithmetic logic unit 130 to the output of the read only memory 136. The other input to the arithmetic logic unit 130 couples to the random access memory 136 through a multi-pole electronic switch 148 which is also adapted to input the $E_k$ envelope samples which have been subjected to a fixed scaling and clipping operation which is provided by means of the circuit 150.

Figure 10:
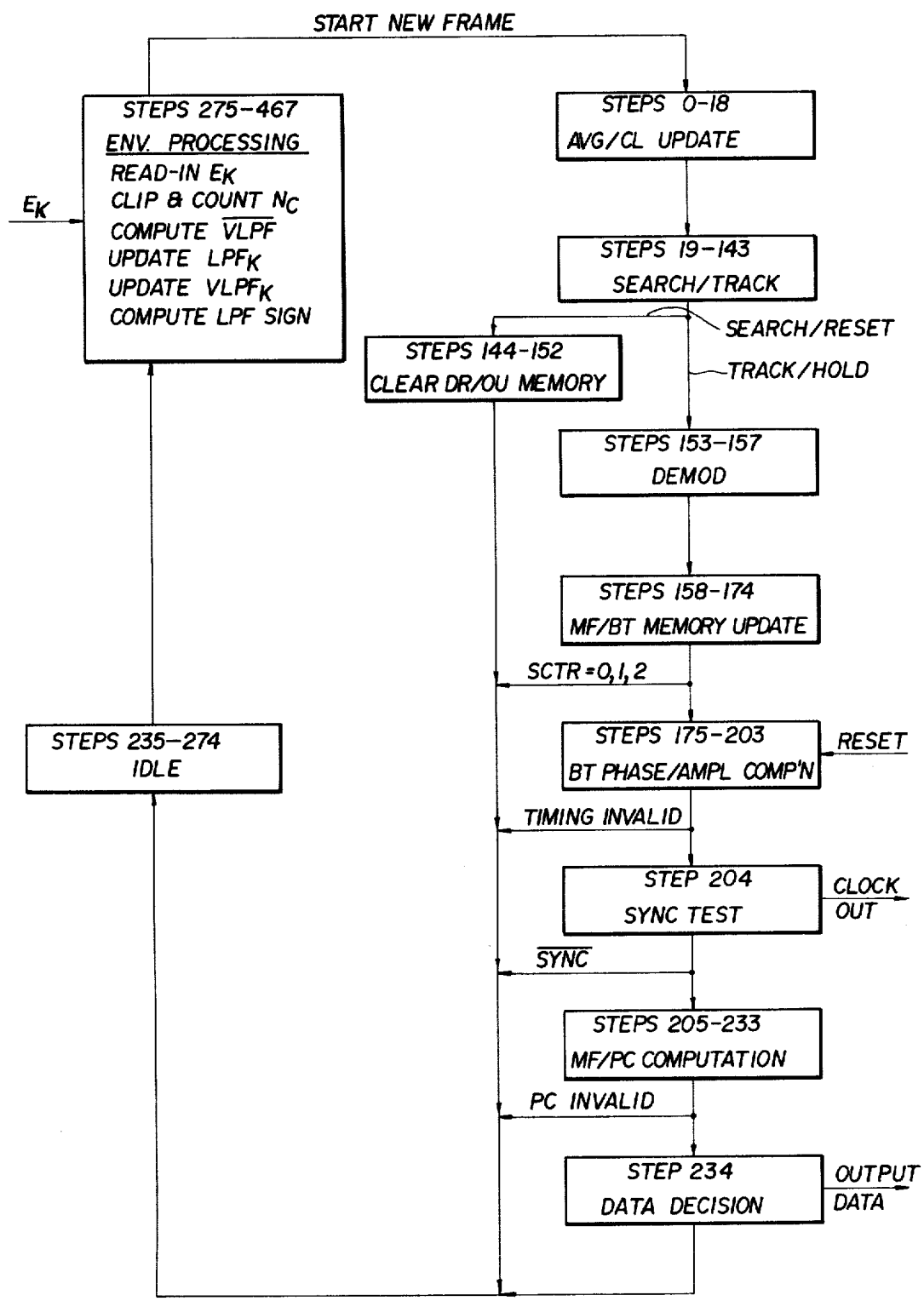
FIG. 10 is a flow chart illustrative of the program cycle of the post-detection processor apparatus shown in FIG. 6.

The post-detection processor operates on a 468-step program cycle, the flow chart of which is diagrammatically illustrated in FIG. 10. The program cycle operates at a 557.856 KHz clock rate in accordance with a program stored in the read-only memory 152. A program counter 154 controls the output of instructions which are defined in Appendix IIA and listed in Appendix IIB. The instruction decoder 156, together with the sign latch 131, the search/track unit 158, and the output unit 159 effects a repertoire of 57 circuit configurations as illustrated in Appendix IIC for the 57 instruction types required over the 468-step program cycle.

In operation, each $E_k$ sample is received from the Fourier transform processor (FIG. 5) where it is subjected to both a fixed and an adaptive clipping operation. The fixed clip level is set at "$\frac{1}{2}$ of positive full scale", while the adaptive clip level is at "K1×AVG" which is a controllable number of db above the average spectrum background level, the constant K1 being set by the control unit 42 shown in FIG. 1.

The clipped $E_k$ values are stored and used as input data for a recursive low pass filter (LPF) and very low pass filter (VLPF) algorithm which have the form:

$$Y_i = Y_{i-1} + K(X_i - Y_{i-1}) \tag{6}$$

where $X_i$ is the input sample for the ith frame, $Y_i$ is the output sample for the ith frame, and K is a controllable time constant (K3 for LPF and K4 for VLPF) selectable from the front panel control unit 42. Each of the 16 narrowband filters is flagged as being below threshold by forcing the sign of its LPF value negative whenever its short term energy does not exceed its VLPF value (long term energy) by a controllable threshold constant K5. The average spectrum level (AVG) is updated every frame to the mean value of all VLPF's whose corresponding $E_k$ values were below the clipped level. The previous AVG value is retained, however, if more than a controllable number K2 of the $E_k$ values exceeded the clip level.

Next the search algorithm examines the filter LPF values in pairs. There are ten pairs of LPF values with a spacing of four filters, eleven pairs with a spacing of five filters, and ten pairs with a spacing of six filters which fall within the tolerance limits for the FSK (frequency shift keying) sensor transmitters associated with the particular radio receiver AN/USQ-46. These thirty-one pairs of LPF values are examined sequentially to find a pair above a predetermined threshold, meaning that both LPF's are positive. If one or more valid pairs are found, the filter pair having the largest sum of LPF's is selected for tracking, otherwise the program remains in the search mode.

The tracking algorithm is adapted to continue selecting an acquired filter pair as long as both LPF's remain above threshold. If either LPF falls below threshold, the next higher or lower filter is selected, provided that it represents a new valid filter pair above threshold, otherwise the program reverts to the search mode. This mode of tracking continues during the eight "0" bits in a message preamble. When a "1" bit (message start flag) is detected, the program switches to a "hold" mode and the last tracked filter pair is retained for the duration of the message.

The demodulator and data regenerator algorithms implemented by the PDP program are active only in the track or hold modes. Demodulation consists of subtracting the stored $E_k$ values for the selected pair of filers to obtain the demodulated data samples $D_i$. A reference level $L_i$, used during data regeneration, is also computed as the sum of the VLPF's for the selected pair of filters. The four most recent $D_i$ samples are stored in the matched filter memory implemented in steps 158-174. Four samples represent approximately one message bit. Bit timing pulses $T_i$ are computed from $D_i$ using the same recursive low pass filter algorithm cited in equation (6) with a predetermined time constant $K_6$. Undelayed samples $D_i$ are supplied to the bit timing algorithm for the first four frames after filter acquisition. Thereafter, delayed samples $\pm D_{i-4}$ are applied with polarity controlled by the last data decision to approximate an unmodulated 300 Hz sine wave. The amplitude and phase of the 300 Hz component in the bit timing memory are computed using a simple 4-point Fourier transform. When the amplitude $E_i$ times a predetermined threshold constant $K_7$ equals the reference level $L_i$, bit timing is declared valid. Thereafter, a sync pulse is generated whenever the computed phase angle $\phi_i$ falls within the sync sector corresponding to a message bit transition. Bit timing is tracked throughout a received message and if it becomes invalid before message completion, the memory is cleared and a search mode reinitiated.

For each frame in which a sync pulse is generated, a matched filter output sample $M_r$ and a preamble correlator output sample $P_r$ are computed. The matched filter output sample is computed from the last four $D_i$ samples and the current phase sample $\phi_i$ according to the following expression:

$$M_r = \frac{1}{4} \sum_{j=0}^{3} D_{i-j} \sin\left(\frac{j\pi}{2} - \phi_i\right) \tag{7}$$

The eight most recent $M_r$ samples are stored and used for computing the preamble correlator samples $P_r$ according to the following expression:

$$P_r = \frac{1}{8}\left[-M_r + \sum_{s=1}^{7} M_{r-s}\right] \tag{8}$$

The last seven preamble "0"s and the flag bit "1" are included in the message preamble correlation. Prior to detection of the flag bit, data decisions are made only if the last $P_r$ sample times a threshold constant $K_8$ exceeds the reference level $L_1$. Data decisions are based on the polarity of the matched filter output $M_r$. Once a data decision is made and found to be valid, the apparatus initiates the hold mode and the preamble correlator samples are ignored for the remainder of the message which is fed to the data decoder 22 in FIG. 1. Upon receipt of either a parity reset pulse indicative of unsuccessful decoding or an EOC (end-of-code) reset pulse indicative of successful decoding, the data regenerator and LPF memory is cleared and the search mode is reinitiated.

Figure 7:
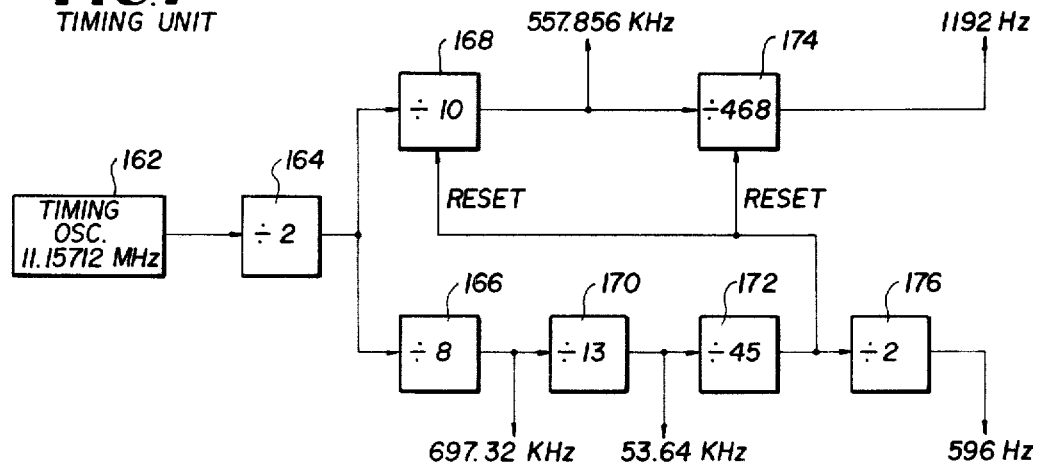
FIG. 7 is an electrical block diagram of the timing unit which provides the clock signals for the subject invention.

In order to synchronize operation of the apparatus described above, the timing unit 38 as shown in FIG. 7 is employed. Basically it consists in utilizing a master timing oscillator 162 whose output is coupled to a plurality of frequency divider circuits. More particularly, where for example the output of the timing oscillator 162 comprises a 11.15712 MHz signal, it is first coupled to a ÷2 frequency divider 164 whose output is branched first to a ÷8 circuit 166 and a ÷10 circuit 168. The output of the divider circuit 166 comprises the 697.32 KHz clock signal which is coupled to the A/D converter 56 shown in FIG. 3. This clock signal is additionally fed to a ÷13 frequency divier circuit 170 which provides the sample rate clock signal of 53.64 KHz applied to the sample and hold circuit 54 as well as the A/D converter 56 shown in FIG. 3. The output of the frequency divider circuit 170 is further divided by a ÷45 circuit 172 which develops a 1192 Hz reset signal for the ÷10 divider circuit 168 and the ÷468 circuit 174 coupled thereto, the latter providing the 1192 Hz frame rate clock signal applied to the shift clock and gate generator 72 shown in FIG. 4 while the output of the ÷10 circuit 168 comprises the 557.856 KHz program clock signals applied to the envelope weighting computer (FIG. 4), the Fourier transform processor (FIG. 5), and the post-detection processor (FIG. 7). In addition, a ÷2 circuit 176 is coupled to the frequency divider 172 for providing a 596 Hz signal which is applied to the shift clock and gate generator circuit 72 shown in FIG. 4 for developing the gate signal E for controlling input buffer alternation between the operation of the shift registers 62 and 64.

In summation, what is disclosed is a digital signal processor including means for synthesizing a bank of contiguous narrowband filters, all having the same shape of frequency response and differing only in center frequency, for detecting IF signals extracted from an FSK RF receiver to recover data messages which are then reinserted into data decoder and display apparatus of the receiver.

While there has been shown and described what is at present considered to be the preferred embodiments of the subject invention, further modifications thereto will readily occur to those skilled in the art. It is not desired, therefore, that the invention be limited to specific arrangements as shown and described, but it is to be understood that all equivalents, alterations and modifications coming within the spirit and scope of the invention as defined by the subjoined claims are herein meant to be included.

APPENDIX-IA
Definition of FTP Instructions

| Instructions Type | Name | PC 31 | PC 30 | SC 29 | SC 28 | $S_4$ 27 | $S_3$ 26 | $S_2$ 25 | $S_1$ 24 | BC 23 | ALU 22 | ALU 21 | 20 | DC 9 | DC 18 | Times Used |
|---|---|---|---|---|---|---|---|---|---|---|---|---|---|---|---|---|
| 1 | INPUT | 0 | 0 | 0 | 0 | 0 | 0 | 0 | 0 | 1 | 1 | 1 | 0 | 1 | 0 | 48 |
| 2 | 22+− | 0 | 0 | 1 | 1 | 0 | 1 | 0 | 1 | 1 | 1 | 0 | 0 | 1 | 0 | 44 |
| 3 | 22−2 | 0 | 0 | 1 | 1 | 0 | 1 | 0 | 1 | 1 | 1 | 0 | 0 | 0 | 1 | 3 |
| 4 | 22−+ | 0 | 0 | 1 | 1 | 0 | 1 | 0 | 1 | 1 | 0 | 1 | 0 | 1 | 0 | 30 |
| 5 | 22−1 | 0 | 0 | 1 | 1 | 0 | 1 | 0 | 1 | 1 | 0 | 1 | 1 | 0 | 0 | 1 |
| 6 | 24+− | 0 | 0 | 1 | 1 | 1 | 1 | 0 | 1 | 1 | 1 | 0 | 0 | 1 | 0 | 8 |
| 7 | 24−2 | 0 | 0 | 1 | 1 | 1 | 1 | 0 | 1 | 1 | 1 | 0 | 0 | 0 | 1 | 4 |
| 8 | 42+− | 0 | 0 | 1 | 1 | 0 | 1 | 1 | 1 | 1 | 1 | 0 | 0 | 1 | 0 | 6 |
| 9 | M22+− | 0 | 0 | 1 | 0 | 0 | 1 | 0 | 1 | 0 | 1 | 0 | 0 | 1 | 0 | 1 |
| 10 | M22+1 | 0 | 0 | 1 | 0 | 0 | 1 | 0 | 1 | 0 | 1 | 0 | 1 | 0 | 0 | 4 |
| 11 | M22−+ | 0 | 0 | 1 | 0 | 0 | 1 | 0 | 1 | 0 | 0 | 1 | 0 | 1 | 0 | 5 |
| 12 | M22−1 | 0 | 0 | 1 | 0 | 0 | 1 | 0 | 1 | 0 | 0 | 1 | 1 | 0 | 0 | 6 |
| 13 | /THRU/ | 1 | 1 | 1 | 1 | 0 | 0 | 0 | 0 | 1 | 1 | 1 | 0 | 1 | 0 | 1 |
| 14 | /11/ | 1 | 1 | 1 | 1 | 0 | 0 | 0 | 0 | 1 | 1 | 0 | 0 | 1 | 0 | 8 |
| 15 | /12/ | 1 | 1 | 1 | 1 | 0 | 1 | 0 | 0 | 1 | 1 | 0 | 0 | 1 | 0 | 2 |
| 16 | /22/ | 1 | 1 | 1 | 1 | 0 | 1 | 0 | 1 | 1 | 1 | 0 | 0 | 1 | 0 | 1 |
| 17 | /M21/ | 1 | 1 | 1 | 0 | 0 | 0 | 0 | 1 | 0 | 1 | 0 | 0 | 1 | 0 | 2 |
| 18 | /M22/ | 1 | 1 | 1 | 0 | 0 | 1 | 0 | 1 | 0 | 1 | 0 | 0 | 1 | 0 | 1 |
| 19 | /M22/1 | 1 | 1 | 1 | 0 | 0 | 1 | 0 | 1 | 0 | 1 | 0 | 1 | 0 | 0 | 1 |
| 20 | /M22/2 | 1 | 1 | 1 | 0 | 0 | 1 | 0 | 1 | 0 | 0 | 1 | 0 | 0 | 1 | 1 |
| 21 | SCALE | 0 | 0 | 1 | 1 | 0 | 1 | 0 | 1 | 1 | 1 | 1 | 1 | 0 | 0 | 2 |
| 22 | SWAP | 0 | 0 | 1 | 1 | 0 | 0 | 0 | 0 | 1 | 0 | 0 | 0 | 1 | 0 | 7 |
| 23 | SWAP 1 | 0 | 0 | 1 | 1 | 0 | 0 | 0 | 0 | 1 | 0 | 0 | 1 | 0 | 0 | 9 |
| 24 | SWAP 2 | 0 | 0 | 1 | 1 | 0 | 0 | 0 | 0 | 1 | 0 | 0 | 0 | 0 | 1 | 25 |
| 25 | RSWAP | 0 | 0 | 0 | 1 | 0 | 0 | 0 | 0 | 0 | 0 | 0 | 0 | 1 | 0 | 15 |
| 26 | RSWAP 1 | 0 | 0 | 0 | 1 | 0 | 0 | 0 | 0 | 0 | 0 | 0 | 1 | 0 | 0 | 2 |
| 27 | MSWAP | 0 | 0 | 1 | 0 | 0 | 0 | 0 | 0 | 0 | 0 | 0 | 1 | 0 | 0 | 21 |
| 28 | LARGER | 0 | 0 | 1 | 1 | 0 | 0 | 0 | 0 | 1 | 1 | 0 | 1 | 1 | 1 | 16 |
| 29 | SKIP | 0 | 1 | 1 | 1 | 0 | 0 | 0 | 0 | 1 | 0 | 0 | 0 | 1 | 0 | 16 |
| 30 | X+− | 1 | 0 | 0 | 1 | 0 | 0 | 0 | 0 | 0 | 1 | 0 | 0 | 1 | 1 | 64 |
| 31 | TAN 16 | 0 | 0 | 1 | 0 | 0 | 0 | 0 | 0 | 0 | 1 | 0 | 1 | 1 | 1 | 16 |
| 32 | TAN X | 0 | 0 | 1 | 0 | 0 | 0 | 0 | 0 | 1 | 1 | 0 | 1 | 1 | 1 | 48 |
| 33 | SIN X | 0 | 0 | 1 | 0 | 0 | 0 | 0 | 0 | 1 | 0 | 0 | 1 | 0 | 0 | 16 |
| 34 | COS X | 0 | 0 | 0 | 1 | 0 | 0 | 0 | 0 | 0 | 1 | 0 | 0 | 1 | 1 | 16 |
| 35 | OUTPUT | 0 | 0 | 1 | 0 | 0 | 0 | 0 | 0 | 1 | 0 | 1 | 1 | 0 | 1 | 17 |
| 36 | IDLE | 1 | 1 | 1 | 1 | 1 | 1 | 1 | 1 | 1 | 1 | 1 | 1 | 1 | 1 | 1 |

APPENDIX-1A
Definition of FTP Instructions

| INSTRUCTIONS | | PC | SC | S4 | S3 | S2 | S1 | BC | ALU | DC | | Times |
|---|---|---|---|---|---|---|---|---|---|---|---|---|
| Type | Name | 31 30 | 29 28 | 27 | 26 | 25 | 24 | 23 | 22 21 | 20 9 | 18 | Used |
| | | | | | | | | | | | | 468 |

APPENDIX-IB
FTP Program List

| STEP | INSTR | F1 | F2 | ROM |
|---|---|---|---|---|
| 0 | INPUT | 0 | 0 | 63 |
| 1 | | 1 | 1 | |
| 2 | | 2 | 2 | |
| 3 | | 3 | 3 | |
| 4 | | 4 | 4 | |
| 5 | | 5 | 5 | |
| 6 | | 6 | 6 | |
| 7 | | 7 | 7 | |
| 8 | | 8 | 8 | |
| 9 | | 9 | 9 | |
| 10 | | 10 | 10 | |
| 11 | | 11 | 11 | |
| 12 | | 12 | 12 | |
| 13 | | 13 | 13 | |
| 14 | | 14 | 14 | |
| 15 | | 15 | 15 | |
| 16 | | 16 | 16 | |
| 17 | | 17 | 17 | |
| 18 | | 18 | 18 | |
| 19 | | 19 | 19 | |
| 20 | | 20 | 20 | |
| 21 | | 21 | 21 | |
| 22 | | 22 | 22 | |
| 23 | | 23 | 23 | |
| 24 | | 24 | 24 | |
| 25 | | 25 | 25 | |
| 26 | | 26 | 26 | |
| 27 | | 27 | 27 | |
| 28 | | 28 | 28 | |
| 29 | | 29 | 29 | |
| 30 | | 30 | 30 | |
| 31 | | 31 | 31 | |
| 32 | | 32 | 32 | |
| 33 | | 33 | 33 | |
| 34 | | 34 | 34 | |
| 35 | | 35 | 35 | |
| 36 | | 36 | 36 | |
| 37 | | 37 | 37 | |
| 38 | | 38 | 38 | |
| 39 | | 39 | 39 | |
| 40 | | 40 | 40 | |
| 41 | | 41 | 41 | |
| 42 | | 42 | 42 | |
| 43 | | 43 | 43 | |
| 44 | | 44 | 44 | |
| 45 | | 45 | 45 | |
| 46 | | 46 | 46 | |
| 47 | | 47 | 47 | |
| 48 | 22+− | 1 | | |
| 49 | | 2 | 46 | |
| 50 | | 3 | 45 | |
| 51 | | 4 | 44 | |
| 52 | | 5 | 43 | |
| 53 | | 6 | 42 | |
| 54 | | 7 | 41 | |
| 55 | | 8 | 40 | |
| 56 | | 9 | 39 | |
| 57 | | 10 | 38 | |
| 58 | | 11 | 37 | |
| 59 | 22−+ | 12 | 36 | |
| 60 | | 13 | 35 | |
| 61 | | 14 | 34 | |
| 62 | | 15 | 33 | |
| 63 | | 16 | 32 | |
| 64 | | 17 | 31 | |
| 65 | | 18 | 30 | |
| 66 | | 19 | 29 | |
| 67 | | 20 | 28 | |
| 68 | | 21 | 27 | |
| 69 | | 22 | 26 | |
| 70 | | 23 | 25 | |
| 71 | 22+− | 0 | 24 | |
| 72 | | 1 | 25 | |
| 73 | | 2 | 26 | |
| 74 | | 3 | 27 | |
| 75 | | 4 | 28 | |
| 76 | | 5 | 29 | |
| 77 | 22−+ | 6 | 30 | |
| 78 | | 7 | 31 | |
| 79 | | 8 | 32 | |
| 80 | | 9 | 33 | |
| 81 | | 10 | 34 | |
| 82 | | 11 | 35 | |
| 83 | 22+− | 23 | 47 | |
| 84 | | 22 | 46 | |
| 85 | | 21 | 45 | |
| 86 | | 20 | 44 | |
| 87 | | 19 | 43 | |
| 88 | | 18 | 42 | |
| 89 | 22−+ | 17 | 41 | |
| 90 | | 16 | 40 | |
| 91 | | 15 | 39 | |
| 92 | | 14 | 38 | |
| 93 | | 13 | 37 | |
| 94 | 22+− | 0 | 36 | |
| 95 | | 1 | 35 | |
| 96 | | 2 | 34 | |
| 97 | 22−+ | 3 | 33 | |
| 98 | | 4 | 32 | |
| 99 | | 5 | 31 | |
| 100 | 22+− | 11 | 29 | |
| 101 | | 10 | 26 | |
| 102 | | 7 | 25 | |
| 103 | | 23 | 41 | |
| 104 | | 22 | 38 | |
| 105 | | 19 | 37 | |
| 106 | | 13 | 47 | |
| 107 | | 14 | 46 | |
| 108 | | 15 | 45 | |
| 109 | 22−+ | 16 | 44 | |
| 110 | | 17 | 43 | |
| 111 | 22+− | 0 | 30 | |
| 112 | | 1 | 31 | |
| 113 | 22−+ | 2 | 32 | |
| 114 | 22+− | 5 | 35 | |
| 115 | RSWAP | 12 | 12 | 52 |
| 116 | 22+− | 13 | 43 | |
| 117 | | 17 | 47 | |
| 118 | 22−+ | 16 | 46 | |
| 119 | 22−1 | 0 | 32 | |
| 120 | 22−2 | 1 | 33 | |
| 121 | 24+− | 2 | 30 | |
| 122 | RSWAP | 5 | 5 | |
| 123 | 24+− | 4 | 36 | |
| 124 | 42+− | 3 | 35 | |
| 125 | 24+− | 11 | 27 | |
| 126 | RSWAP | 10 | 10 | |
| 127 | 42+− | 9 | 25 | |
| 128 | 24+− | 8 | 24 | |
| 129 | RSWAP | 7 | 7 | |
| 130 | 42+− | 6 | 26 | |
| 131 | 24+− | 23 | 39 | |
| 132 | RSWAP | 22 | 22 | |
| 133 | 42+− | 21 | 37 | |
| 134 | 24+− | 20 | 12 | |
| 135 | SWAP2 | 19 | 19 | |
| 136 | 42+− | 18 | 38 | |
| 137 | RSWAP | 13 | 13 | |

-continued

APPENDIX-IB
FTP Program List

| STEP | INSTR | F1 | F2 | ROM |
|------|-------|----|----|-----|
| 138 | 24+− | 14 | 42 | |
| 139 | 42+− | 15 | 43 | |
| 140 | 24+− | 17 | 45 | |
| 141 | RSWAP | 16 | 16 | |
| 142 | /M22/2 | 2 | 31 | 42 |
| 143 | MSWAP | 62 | 5 | |
| 144 | 22−2 | | 35 | |
| 145 | M22−1 | 4 | 34 | |
| 146 | SWAP2 | 3 | 3 | |
| 147 | M22−+ | 11 | 7 | |
| 148 | SWAP2 | | 11 | |
| 149 | MSWAP | 62 | 10 | |
| 150 | 22+− | | 26 | |
| 151 | RSWAP | | 10 | 52 |
| 152 | | 9 | 9 | |
| 153 | M22−+ | 8 | 28 | 42 |
| 154 | RSWAP | 6 | 6 | 52 |
| 155 | MSWAP | 29 | 29 | 42 |
| 156 | 22+− | | 25 | |
| 157 | SWAP2 | | 29 | |
| 158 | M22+− | 23 | 19 | |
| 159 | RSWAP | | 23 | 52 |
| 160 | MSWAP | 61 | 22 | 42 |
| 161 | 22+− | | 38 | |
| 162 | RSWAP | | 22 | 52 |
| 163 | SWAP2 | 21 | 21 | |
| 164 | M22−+ | 20 | 40 | 42 |
| 165 | RSWAP | 18 | 18 | 52 |
| 166 | MSWAP | 41 | 41 | 42 |
| 167 | 22+− | | 37 | |
| 168 | SWAP2 | | 41 | |
| 169 | MSWAP | 60 | 13 | |
| 170 | 22−2 | | 43 | |
| 171 | M22−1 | 14 | 44 | |
| 172 | SWAP2 | 15 | 15 | |
| 173 | /M22/1 | 17 | 46 | |
| 174 | MSWAP | 60 | 16 | |
| 175 | /M22/ | | 47 | |
| 176 | MSWAP | 3 | 3 | 44 |
| 177 | /12/ | | 36 | |
| 178 | /M21/ | 4 | 35 | |
| 179 | MSWAP | 56 | 47 | 46 |
| 180 | M22+1 | | 25 | 40 |
| 181 | MSWAP | 59 | 10 | 44 |
| 182 | 24−2 | | 28 | |
| 183 | MSWAP | 58 | 9 | 46 |
| 184 | M22−1 | | 27 | 40 |
| 185 | MSWAP | 11 | 11 | |
| 186 | | 29 | | 46 |
| 187 | M22+1 | 11 | 29 | |
| 188 | M22−1 | 29 | | 40 |
| 189 | MSWAP | 59 | 6 | 44 |
| 190 | 24−2 | | 24 | |
| 191 | SCALE | 8 | 63 | |
| 192 | M22−+ | | 26 | |
| 193 | RSWAP | | 8 | 52 |
| 194 | MSWAP | 59 | 23 | 46 |
| 195 | M22+1 | | 37 | 40 |
| 196 | MSWAP | 57 | 22 | 44 |
| 197 | 24−2 | | 40 | |
| 198 | MSWAP | 21 | 21 | 46 |
| 199 | M22−1 | | 39 | 40 |
| 200 | MSWAP | 41 | 19 | |
| 201 | | 19 | | 46 |
| 202 | M22+1 | 41 | 41 | |
| 203 | M22−1 | 19 | | 40 |
| 204 | MSWAP | 57 | 18 | 44 |
| 205 | 24−2 | | 12 | |
| 206 | SCALE | 20 | 63 | |
| 207 | M22−+ | | 38 | |
| 208 | RSWAP | | 20 | 52 |
| 209 | MSWAP | 15 | 15 | 44 |
| 210 | /12/ | | 42 | |
| 211 | /M21/ | 14 | 43 | |
| 212 | /22/ | 0 | 33 | |
| 213 | /11/ | 56 | 28 | |
| 214 | | 11 | 8 | |
| 215 | | 29 | 26 | |

-continued

APPENDIX-IB
FTP Program List

| STEP | INSTR | F1 | F2 | ROM |
|------|-------|----|----|-----|
| 216 | | 58 | 24 | |
| 217 | | 59 | 40 | |
| 218 | | 41 | 20 | |
| 219 | | 19 | 38 | |
| 220 | | 21 | 12 | |
| 221 | SWAP | 0 | 40 | |
| 222 | | 3 | 38 | |
| 223 | | 4 | 20 | |
| 224 | | 56 | 12 | |
| 225 | | 11 | 43 | |
| 226 | | 29 | 42 | |
| 227 | | 58 | 45 | |
| 228 | SWAP1 | 47 | 47 | |
| 229 | /THRU/ | 58 | 30 | |
| 230 | LARGER | 17 | 31 | |
| 231 | SKIP | | | |
| 232 | LARGER | 3 | 26 | |
| 233 | SKIP | | | |
| 234 | LARGER | 15 | 38 | |
| 235 | SKIP | | | |
| 236 | LARGER | 4 | 8 | |
| 237 | SKIP | | | |
| 238 | LARGER | 60 | 40 | |
| 239 | SKIP | | | |
| 240 | LARGER | 56 | 24 | |
| 241 | SKIP | | | |
| 242 | LARGER | 14 | 20 | |
| 243 | SKIP | | | |
| 244 | LARGER | 59 | 12 | |
| 245 | SKIP | | | |
| 246 | LARGER | 58 | 30 | |
| 247 | SKIP | | | |
| 248 | LARGER | 0 | 28 | |
| 249 | SKIP | | | |
| 250 | LARGER | 11 | 35 | |
| 251 | SKIP | | | |
| 252 | LARGER | 21 | 45 | |
| 253 | SKIP | | | |
| 254 | LARGER | 47 | 33 | |
| 255 | SKIP | | | |
| 256 | LARGER | 41 | 43 | |
| 257 | SKIP | | | |
| 258 | LARGER | 29 | 36 | |
| 259 | SKIP | | | |
| 260 | LARGER | 19 | 42 | |
| 261 | SKIP | | | |
| 262 | RSWAP1 | 55 | | 52 |
| 263 | TAN16 | 17 | 31 | 16 |
| 264 | X+− | 55 | | 54 |
| 265 | TANX | 17 | | |
| 266 | X+− | 55 | | 56 |
| 267 | TANX | 17 | | |
| 268 | X+− | 55 | | 58 |
| 269 | TANX | 17 | | |
| 270 | X+− | 55 | | 60 |
| 271 | SWAP2 | 17 | 54 | |
| 272 | SINX | | | |
| 273 | COSX | 55 | | 50 |
| 274 | OUTPUT | 17 | 31 | |
| 275 | TAN16 | 3 | 26 | 16 |
| 276 | X+− | 12 | | 54 |
| 277 | TANX | 3 | | |
| 278 | X+− | 12 | | 56 |
| 279 | TANX | 3 | | |
| 280 | X+− | 12 | | 58 |
| 281 | TANX | 3 | | |
| 282 | X+− | 12 | | 60 |
| 283 | SWAP2 | 3 | 54 | |
| 284 | SINX | | | |
| 285 | COSX | 12 | | 50 |
| 286 | OUTPUT | 3 | 26 | |
| 287 | TAN16 | 15 | 38 | 16 |
| 288 | X+− | 5 | | 54 |
| 289 | TANX | 15 | | |
| 290 | X+− | 5 | | 56 |
| 291 | TANX | 15 | | |
| 292 | X+− | 5 | | 58 |
| 293 | TANX | 15 | | |

APPENDIX-IB
FTP Program List

| STEP | INSTR | F1 | F2 | ROM |
|------|-------|----|----|-----|
| 294 | X+− | 5 | | 60 |
| 295 | SWAP2 | 15 | 54 | |
| 296 | SINX | | | |
| 297 | COSX | 5 | | 50 |
| 298 | OUTPUT | 15 | 38 | |
| 299 | TAN16 | 4 | 8 | 16 |
| 300 | X+− | 10 | | 54 |
| 301 | TANX | 4 | | |
| 302 | X+− | 10 | | 56 |
| 303 | TANX | 4 | | |
| 304 | X+− | 10 | | 58 |
| 305 | TANX | 4 | | |
| 306 | X+− | 10 | | 60 |
| 307 | SWAP2 | 4 | 54 | |
| 308 | SINX | | | |
| 309 | COSX | 10 | | 50 |
| 310 | OUTPUT | 4 | 8 | |
| 311 | TAN16 | 60 | 40 | 16 |
| 312 | X+− | 22 | | 54 |
| 313 | TANX | 60 | | |
| 314 | X+− | 22 | | 56 |
| 315 | TANX | 60 | | |
| 316 | X+− | 22 | | 58 |
| 317 | TANX | 60 | | |
| 318 | X+− | 22 | | 60 |
| 319 | SWAP2 | 60 | 54 | |
| 320 | SINX | | | |
| 321 | COSX | 22 | | 50 |
| 322 | OUTPUT | 60 | 40 | |
| 323 | TAN16 | 56 | 24 | 16 |
| 324 | X+− | 13 | | 54 |
| 325 | TANX | 56 | | |
| 326 | X+− | 13 | | 56 |
| 327 | TANX | 56 | | |
| 328 | X+− | 13 | | 58 |
| 329 | TANX | 56 | | |
| 330 | X+− | 13 | | 60 |
| 331 | SWAP2 | 56 | 54 | |
| 332 | SINX | | | |
| 333 | COSX | 13 | | 50 |
| 334 | OUTPUT | 56 | 24 | |
| 335 | TAN16 | 14 | 20 | 16 |
| 336 | X+− | 16 | | 54 |
| 337 | TANX | 14 | | |
| 338 | X+− | 16 | | 56 |
| 339 | TANX | 14 | | |
| 340 | X+− | 16 | | 58 |
| 341 | TANX | 14 | | |
| 342 | X+− | 16 | | 60 |
| 343 | SWAP2 | 14 | 54 | |
| 344 | SINX | | | |
| 345 | COSX | 16 | | 50 |
| 346 | OUTPUT | 14 | 20 | |
| 347 | TAN16 | 59 | 12 | 16 |
| 348 | X+− | 62 | | 54 |
| 349 | TANX | 59 | | |
| 350 | X+− | 62 | | 56 |
| 351 | TANX | 59 | | |
| 352 | X+− | 62 | | 58 |
| 353 | TANX | 59 | | |
| 354 | X+− | 62 | | 60 |
| 355 | SWAP2 | 59 | 54 | |
| 356 | SINX | | | |
| 357 | COSX | 62 | | 50 |
| 358 | OUTPUT | 59 | 12 | |
| 359 | TAN16 | 58 | 30 | 16 |
| 360 | X+− | 61 | | 54 |
| 361 | TANX | 58 | | |
| 362 | X+− | 61 | | 56 |
| 363 | TANX | 58 | | |
| 364 | X+− | 61 | | 58 |
| 365 | TANX | 58 | | |
| 366 | X+− | 61 | | 60 |
| 367 | SWAP2 | 58 | 54 | |
| 368 | SINX | | | |
| 369 | COSX | 61 | | 50 |
| 370 | OUTPUT | 58 | 30 | |
| 371 | TAN16 | 0 | 28 | 16 |
| 372 | X+− | 23 | | 54 |
| 373 | TANX | 0 | | |
| 374 | X+− | 23 | | 56 |
| 375 | TANX | 0 | | |
| 376 | X+− | 23 | | 58 |
| 377 | TANX | 0 | | |
| 378 | X+− | 23 | | 60 |
| 379 | SWAP2 | 0 | 54 | |
| 380 | SINX | | | |
| 381 | COSX | 23 | | 50 |
| 382 | OUTPUT | 0 | 28 | |
| 383 | TAN16 | 11 | 35 | 16 |
| 384 | X+− | 9 | | 54 |
| 385 | TANX | 11 | | |
| 386 | X+− | 9 | | 56 |
| 387 | TANX | 11 | | |
| 388 | X+− | 9 | | 58 |
| 389 | TANX | 11 | | |
| 390 | X+− | 9 | | 60 |
| 391 | SWAP2 | 11 | 54 | |
| 392 | SINX | | | |
| 393 | COSX | 9 | | 50 |
| 394 | OUTPUT | 11 | 35 | |
| 395 | TAN16 | 21 | 45 | 16 |
| 396 | X+− | 18 | | 54 |
| 397 | TANX | 21 | | |
| 398 | X+− | 18 | | 56 |
| 399 | TANX | 21 | | |
| 400 | X+− | 18 | | 58 |
| 401 | TANX | 21 | | |
| 402 | X+− | 18 | | 60 |
| 403 | SWAP2 | 21 | 54 | |
| 404 | SINX | | | |
| 405 | COSX | 18 | | 50 |
| 406 | OUTPUT | 21 | 45 | |
| 407 | TAN16 | 47 | 33 | 16 |
| 408 | X+− | 7 | | 54 |
| 409 | TANX | 47 | | |
| 410 | X+− | 7 | | 56 |
| 411 | TANX | 47 | | |
| 412 | X+− | 7 | | 58 |
| 413 | TANX | 47 | | |
| 414 | X+− | 7 | | 60 |
| 415 | SWAP2 | 47 | 54 | |
| 416 | SINX | | | |
| 417 | COSX | 7 | | 50 |
| 418 | OUTPUT | 47 | 33 | |
| 419 | TAN16 | 41 | 43 | 16 |
| 420 | X+− | 6 | | 54 |
| 421 | TANX | 41 | | |
| 422 | X+− | 6 | | 56 |
| 423 | TANX | 41 | | |
| 424 | X+− | 6 | | 58 |
| 425 | TANX | 41 | | |
| 426 | X+− | 6 | | 60 |
| 427 | SWAP2 | 41 | 54 | |
| 428 | SINX | | | |
| 429 | COSX | 6 | | 50 |
| 430 | OUTPUT | 41 | 43 | |
| 431 | TAN16 | 29 | 36 | 16 |
| 432 | X+− | 8 | | 54 |
| 433 | TANX | 29 | | |
| 434 | X+− | 8 | | 56 |
| 435 | TANX | 29 | | |
| 436 | X+− | 8 | | 58 |
| 437 | TANX | 29 | | |
| 438 | X+− | 8 | | 60 |
| 439 | SWAP2 | 29 | 54 | |
| 440 | SINX | | | |
| 441 | COSX | 8 | | 50 |
| 442 | OUTPUT | 29 | 36 | |
| 443 | TAN16 | 19 | 42 | 16 |
| 444 | X+− | 20 | | 54 |
| 445 | TANX | 19 | | |
| 446 | X+− | 20 | | 56 |
| 447 | TANX | 19 | | |
| 448 | X+− | 20 | | 58 |
| 449 | TANX | 19 | | |

APPENDIX-IB
FTP Program List

| STEP | INSTR  | F1 | F2 | ROM |
|------|--------|----|----|-----|
| 450  | X+−    | 20 |    | 60  |
| 451  | SWAP2  | 19 | 54 |     |
| 452  | SINX   |    |    |     |
| 453  | COSX   | 20 |    | 50  |
| 454  | OUTPUT | 19 | 42 |     |
| 455  | RSWAP1 | 63 | 63 | 62  |
| 456  | SWAP2  |    |    | 63  |
| 457  | SWAP1  | 62 |    |     |
| 458  |        | 61 |    |     |
| 459  |        | 60 |    |     |
| 460  |        | 59 |    |     |
| 461  |        | 58 |    |     |
| 462  |        | 57 |    |     |
| 463  |        | 56 |    |     |
| 464  |        | 55 |    |     |
| 465  | SWAP2  | 63 | 54 |     |
| 466  | OUTPUT |    | 63 |     |
| 467  | IDLE   |    |    |     |

A blank means use previous entry

APPENDIX-IC
FTP Configurations By Instruction Type

1. 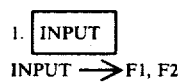

INPUT → F1, F2

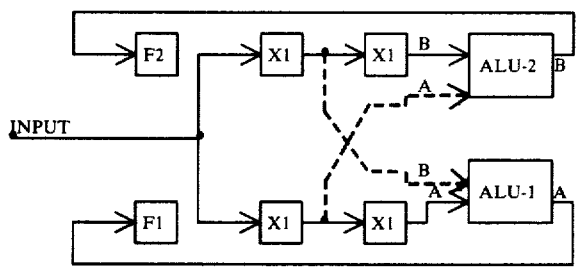

2. 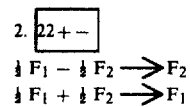

$\frac{1}{2} F_1 - \frac{1}{2} F_2 \rightarrow F_2$
   $\frac{1}{2} F_1 + \frac{1}{2} F_2 \rightarrow F_1$

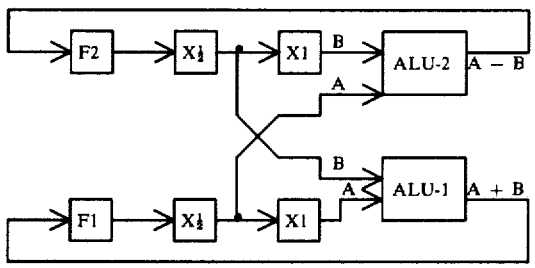

3. 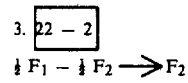

$\frac{1}{2} F_1 - \frac{1}{2} F_2 \rightarrow F_2$

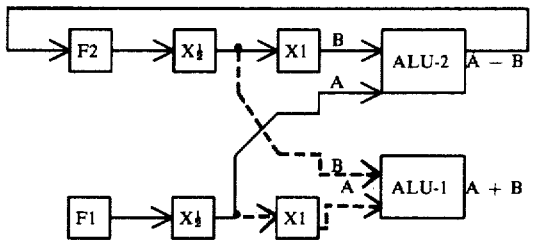

4. 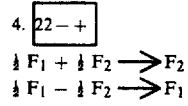

$\frac{1}{2} F_1 + \frac{1}{2} F_2 \rightarrow F_2$
   $\frac{1}{2} F_1 - \frac{1}{2} F_2 \rightarrow F_1$

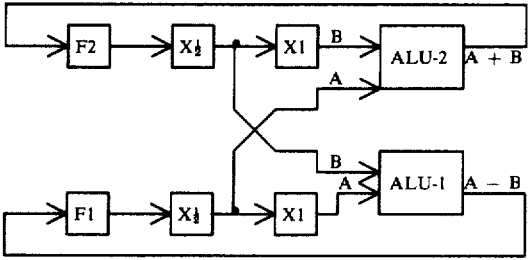

5. 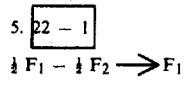

$\frac{1}{2} F_1 - \frac{1}{2} F_2 \rightarrow F_1$

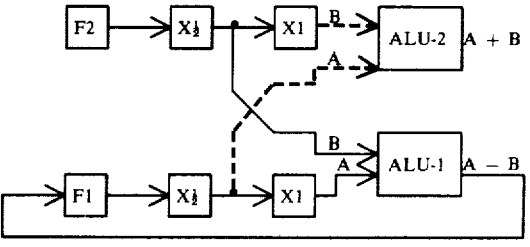

-continued
APPENDIX-IC
FTP Configurations By Instruction Type 6. 24 + −
$\frac{1}{2} F_1 - \frac{1}{2} F_2 \rightarrow F_2$
$\frac{1}{2} F_1 + \frac{1}{2} F_2 \rightarrow F_1$

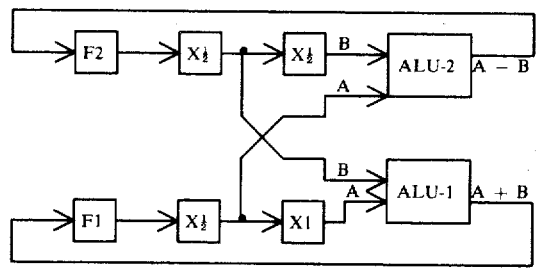

7. 24 − 2
$\frac{1}{2} F_1 - \frac{1}{2} F_2 \rightarrow F_2$

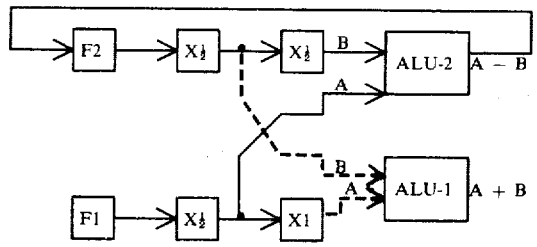

8. 42 + −
$\frac{1}{2} F_1 - \frac{1}{2} F_2 \rightarrow F_2$
$\frac{1}{2} F_1 + \frac{1}{2} F_2 \rightarrow F_1$

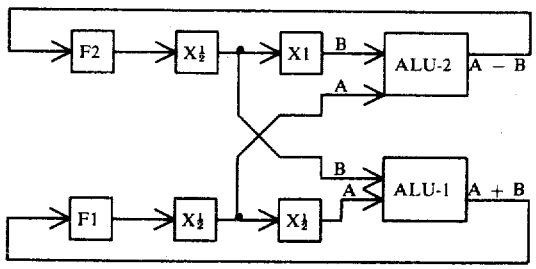

9. M22 + −
$\frac{1}{2} F_1 - \frac{1}{2} (ROM) F_2 \rightarrow F_2$
$\frac{1}{2} F_1 + \frac{1}{2} (ROM) F_2 \rightarrow F_1$

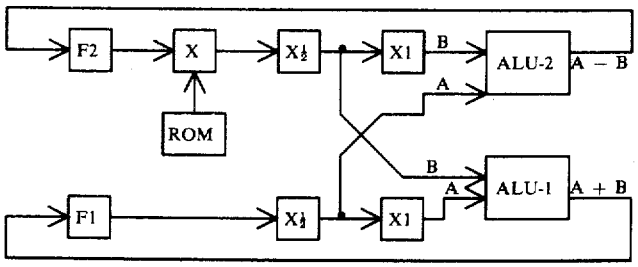

10. M22 + 1
$\frac{1}{2} F_1 + \frac{1}{2} (ROM) F_2 \rightarrow F_1$

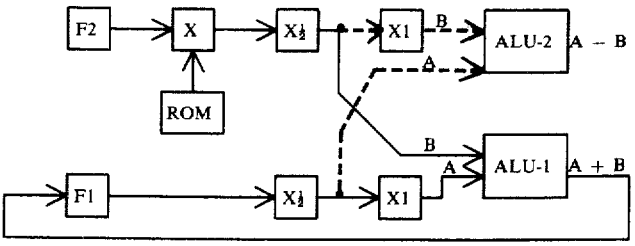

11. M22 − +
$\frac{1}{2} F_1 + \frac{1}{2} (ROM) F_2 \rightarrow F_2$
$\frac{1}{2} F_1 - \frac{1}{2} (ROM) F_2 \rightarrow F_1$

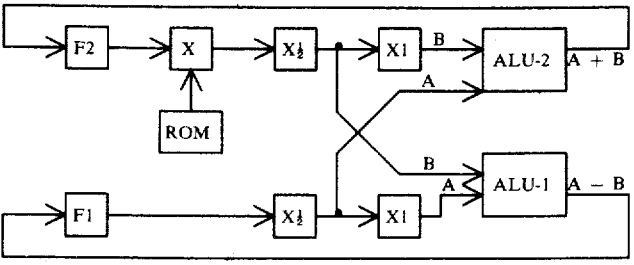

-continued
APPENDIX-IC
FTP Configurations By Instruction Type

12. M22 − 1

$\frac{1}{2} F_1 - \frac{1}{2} (ROM) F_2 \longrightarrow F_1$

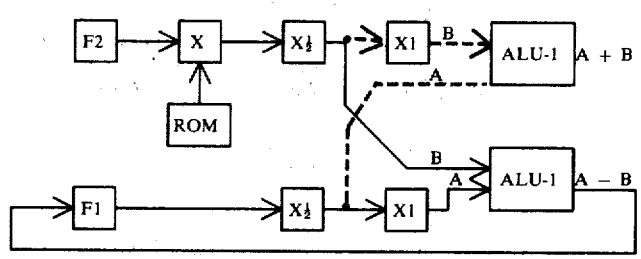

13. /THRU/

$|F_2| \longrightarrow F_2$
$|F_1| \longrightarrow F_1$

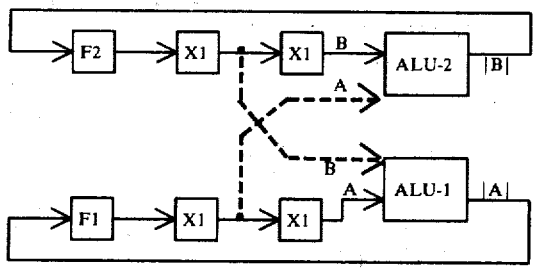

14. /11/

$|F_1 - F_2| \longrightarrow F_2$
$|F_1 + F_2| \longrightarrow F_1$

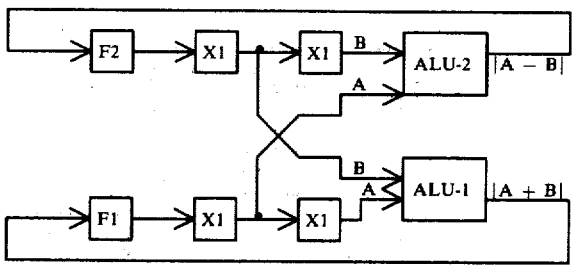

15. /12/

$|F_1 - \frac{1}{2} F_2| \longrightarrow F_2$
$|F_1 + \frac{1}{2} F_2| \longrightarrow F_1$

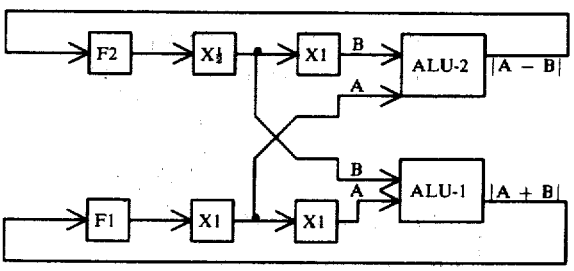

16. /22/

$|\frac{1}{2} F_1 - \frac{1}{2} F_2| \longrightarrow F_2$
$|\frac{1}{2} F_1 + \frac{1}{2} F_2| \longrightarrow F_1$

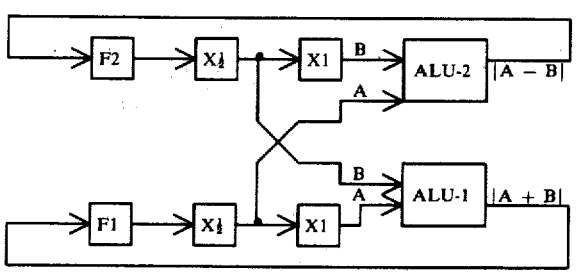

17. /M21/

$|\frac{1}{2} F_1 - (ROM) F_2| \longrightarrow F_2$
$|\frac{1}{2} F_1 + (ROM) F_2| \longrightarrow F_1$

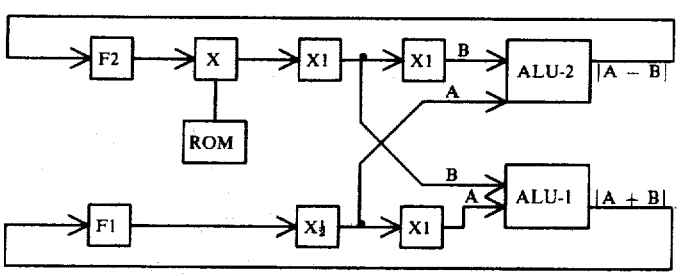

-continued
APPENDIX-IC
FTP Configurations By Instruction Type
18. /M22/
$|\frac{1}{2} F_1 - \frac{1}{2} (ROM) F_2| \rightarrow F_2$
$|\frac{1}{2} F_1 + \frac{1}{2} (ROM) F_2| \rightarrow F_1$
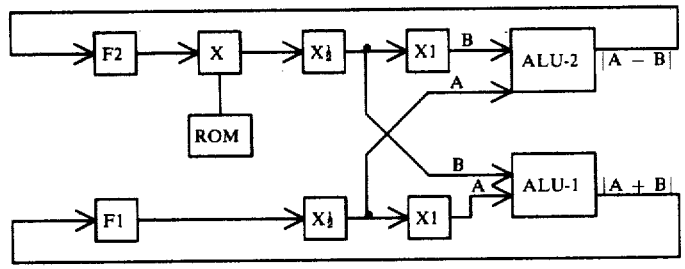
19. /M22/1
$|\frac{1}{2} F_1 + \frac{1}{2} (ROM) F_2| \rightarrow F_1$
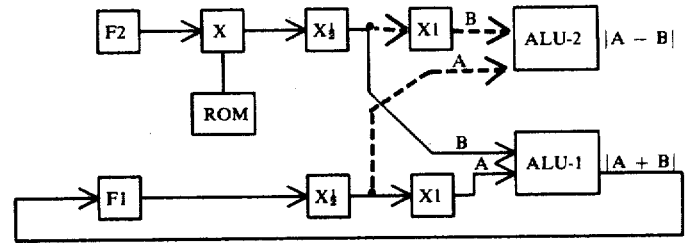
20. /M22/2
$|\frac{1}{2} F_1 + \frac{1}{2} (ROM) F_2| \rightarrow F_2$
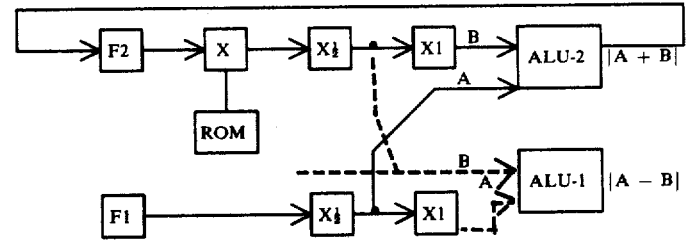
21. SCALE
$\frac{1}{2} F_1 \rightarrow F_1$
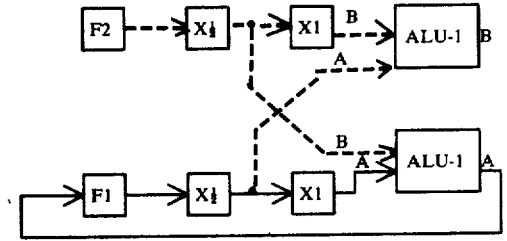
22. SWAP
$F_1 \rightarrow F_2$
$F_2 \rightarrow F_1$
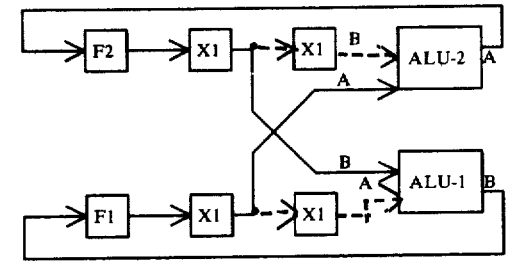
23. SWAP 1
$F_2 \rightarrow F_1$
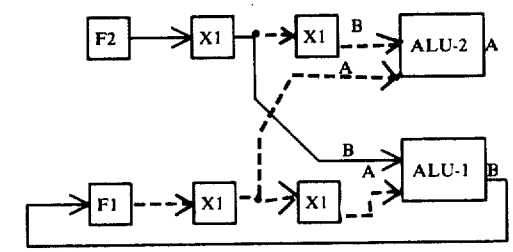

-continued
APPENDIX-IC
FTP Configurations By Instruction Type
24. SWAP 2
$F_1 \longrightarrow F_2$
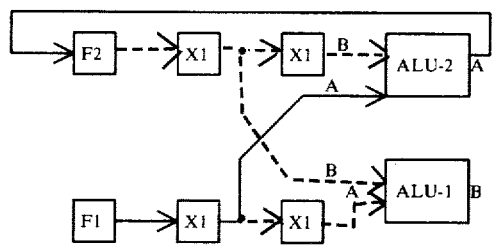
25. RSWAP
$F_1 \longrightarrow F_2$
ROM $\longrightarrow F_1$
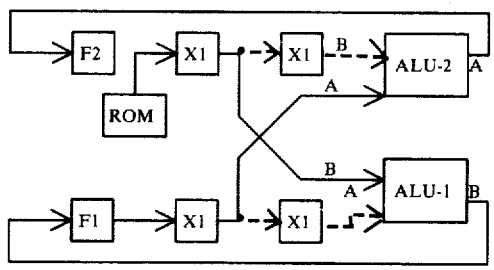
26. RSWAP 1
ROM $\longrightarrow F_1$
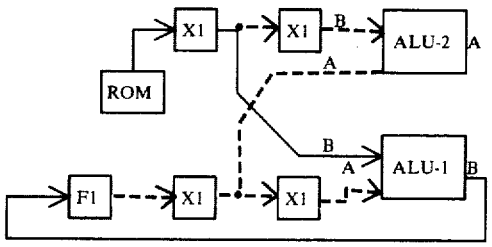
27. MSWAP
(ROM) $F_2 \longrightarrow F_1$
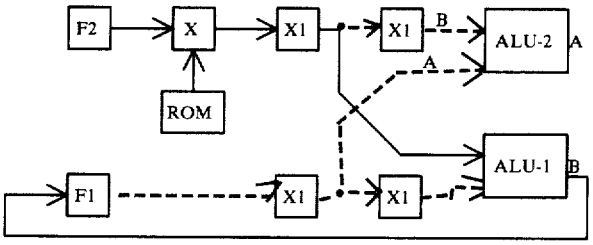
28. LARGER
$F_1 - F_2 \longrightarrow SL$
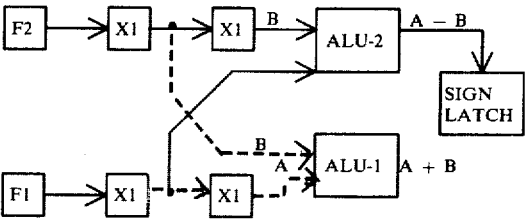
29. SKIP
$F_1 \longrightarrow F_2$ ) If
$F_2 \longrightarrow F_1$ ) SL +
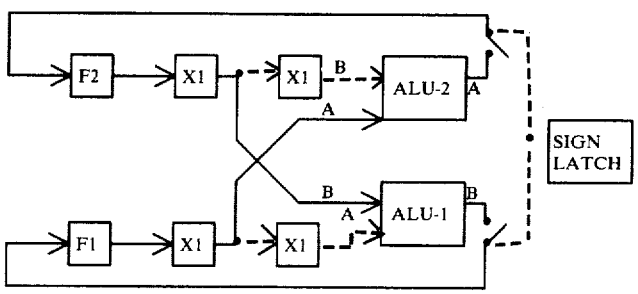

-continued

APPENDIX-IC

FTP Configurations By Instruction Type

30. $\boxed{X + -}$
$F_1 \pm ROM \longrightarrow F_1, \phi LCH$
If SL $\pm$

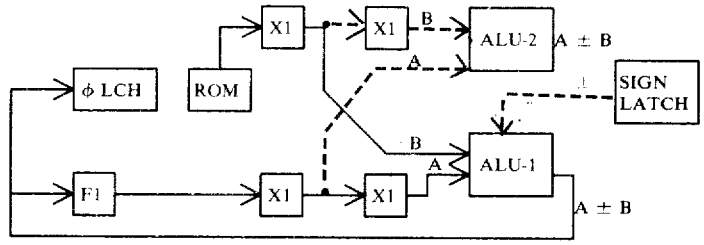

31. $\boxed{TAN\ 16}$
$F_1 - (ROM)\ F_2 \longrightarrow SL$

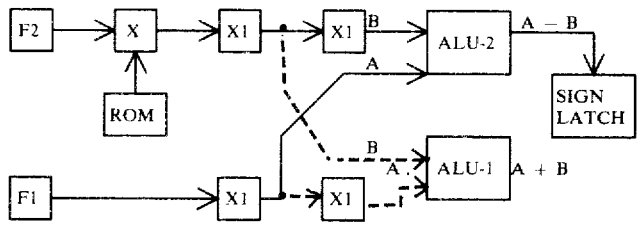

32. $\boxed{TAN\ X}$
$F_1 - (ROM)\ F_2 \longrightarrow SL$
(Indirect ROM Address)

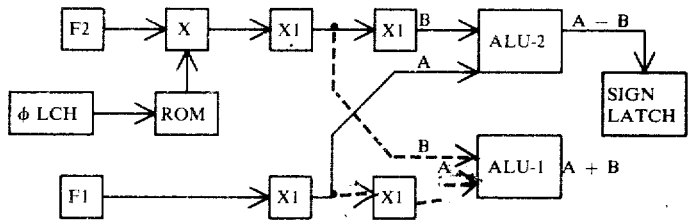

33. $\boxed{SIN\ X}$
$(ROM)\ F_2 \longrightarrow F_1$
(Indirect ROM Address)

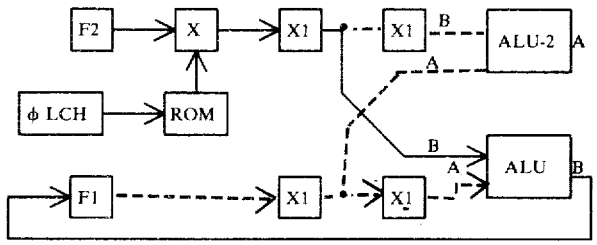

34. $\boxed{COS\ X}$
$F_1 + ROM \longrightarrow F_1, \phi LCH$

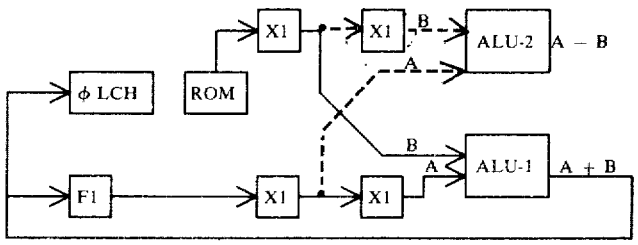

35. $\boxed{OUTPUT}$
$F_1 + (ROM)\ F_2 \longrightarrow OUTPUT$
(Indirect ROM Address)

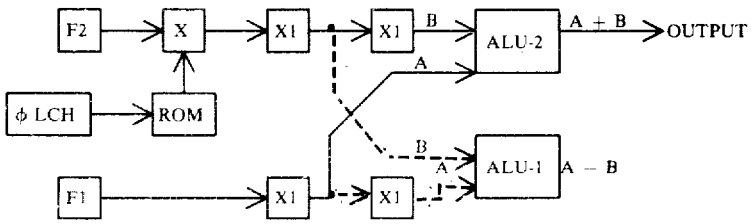

-continued
APPENDIX-IC
FTP Configurations By Instruction Type
36. IDLE
No Operation
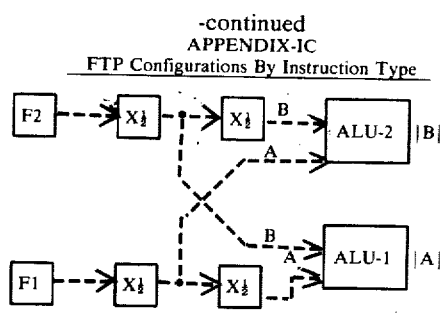

APPENDIX-IIA
PDP ROM Contents

| INSTRUCTION | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | TIMES USED |
|---|---|---|---|---|---|---|---|---|---|---|---|---|---|---|---|---|---|---|---|---|---|---|---|---|---|---|---|---|---|---|---|---|---|
| | ← | | | SOURCE | | | | → | ← | | | ALU | | | | → | ← | DEST | | SKIP HOLD | | | → | ← | CLKS | | → | ← | MISC | | → | |
| | ← | | | A | | | | → | ← | | | B | | | | → | ← | | | C | | | → | ← | | | → | ← | | | → | |
| 0 IDLE | 1 | | | | | | | | | | | | | | | | | | | | | | | | | | | | | | | | 40 |
| 1 INPUT | | | | | | | | | | | | | | | | | | | | | | | | | | | | | | | | | 16 |
| 2 CLIP | | | | | | | | | 1 | 1 | 1 | 1 | | | 1 | | | | | | | | | | | | | | | | | | 16 |
| 3 EKCLIP | | | | | | | | 1 | 1 | 1 | 1 | 1 | | | | | | 1 | | | | | | | | | 1 | | | | | | 17 |
| 4 −25+ | | | | | | | | | | 1 | 1 | 1 | | | | | | 1 | | | | | | 1 | | | | | | | | | 16 |
| 5 M−125+ | | | | | | | 1 | | 1 | 1 | 1 | | | | | | | 1 | | | | | | 1 | | | | | | | | | 16 |
| 6 EPR | | | | | | | | | 1 | 1 | 1 | 1 | 1 | | | | | 1 | | | | | | | | | | | | | | | 32 |
| 7 LPF | | 1 | | | 1 | | | | 1 | 1 | 1 | 1 | | | | | | 1 | | | | | | | | 1 | | | | | | | 16 |
| 8 VLPF | | 1 | | | 1 | | | | 1 | 1 | 1 | 1 | | | | | | 1 | | | | | | | | 1 | | 1 | | | | | 17 |
| 9 R+2 | | 1 | 1 | | | | | | | 1 | 1 | 1 | | | | | | 1 | | | | | | | | | | | | | | | 16 |
| 10 −SL | | | | | | | | | | 1 | 1 | | | | | | 1 | 1 | | | | | | | | | | | | | | | 19 |
| 11 LPFSGN | | | | 1 | | 1 | | | | 1 | | 1 | | | | | | 1 | | | | 1 | | | | | | | | | | | 17 |
| 12 2ISK2 | | | | | | | 1 | | | | | | | | | | | | | | | | | | | | | | | | | | 1 |
| 13 R−SL | | 1 | 1 | | | | | | 1 | 1 | | | | | | | | 1 | | | | | 1 | | | | | | | | | | 1 |
| 14 LSB | | 1 | 1 | | | | | | | 1 | 1 | 1 | | | | | | 1 | | | | | | | | | | | | | | | 23 |
| 15 12 | | | | | | | | | | 1 | 1 | 1 | | | | | | | | | | | | | | | | | | | | | 12 |
| 16 21 | | | | | | | | | 1 | 1 | 1 | 1 | | | | | | | | | 1 | | | | | | | | | | | | 2 |
| 17 DBL | | | | | | | | | 1 | 1 | 1 | 1 | | | | | 1 | 1 | 1 | 1 | | | 1 | | | 1 | | | | | | | 1 |
| 18 DBLS8 | | | | | | | | | | | 1 | 1 | 1 | | | | | 1 | 1 | | | | | | | | | | | | | | 1 |
| 19 +152 | | | | | 1 | | | | | 1 | 1 | 1 | | | | | | 1 | | | | | | | | | | | | | | | 1 |
| 20 FULSCL | | | | | | 1 | | | | | 1 | 1 | | | | | | 1 | | | | | 1 | | | | | | | | | | 1 |
| 21 CLRSTU | | | | | | | | | | 1 | 1 | | | | | | 1 | 1 | | | | | | | | 1 | | | | | | | 31 |
| 22 STU/A | | | | | | | | | | 1 | 1 | | | | | | 1 | 1 | | | | | | | | | | 1 | | | | | 33 |
| 23 LCH12 | | | | | | | | | | 1 | 1 | | | | | | | 1 | | 1 | | | | | | | | | | | | | 31 |
| 24 STU/B | | | | | | | | | | 1 | 1 | | | | | | 1 | 1 | | | | | | 1 | | | | | | | | | 32 |
| 25 2IS− | | | | | | | | | | | 1 | | | | | | | 1 | | | | 1 | | | | | | | | | | | 1 |
| 26 STU/C | | | | | | | | | | 1 | 1 | | | | | | 1 | 1 | | | | | 1 | | | | | | | | | | 8 |
| 27 CLRDR | | | | | | | | | | | 1 | | | | | | | 1 | 1 | 1 | | | 1 | | | | | | | | | | 2 |
| 28 CLROU | | | | | | | | | | | 1 | | | | | | | | 1 | | 1 | | 1 | | | | | | | | | | 1 |
| 29 −LCH | | | | | | | | | | | | | | | | | | | | | | | | 1 | | | | | | | | | 1 |
| 30 +LCH | | | | | | | | | | | | | | | | | | | | | | | | 1 | 1 | | | | | | | | 1 |
| 31 DI | | | | | | | | | | | | | | | | | | | | | 1 | 1 | | | | | | | | | | | 2 |
| 32 −2 | | | | | | | | | | | | | | | | | | | 1 | | | 1 | | | | | | | | | | | 2 |
| 33 M+2 | | | | | | | | | | | | | | | | | | 1 | | | | | | | | | | | | | | | 1 |
| 34 TI | | | | | | | | | | | | | | | | | | 1 | | | | | | | 1 | | | 1 | | | | | 4 |
| 35 HF21 | | | | 1 | | | | | | | | | | | | | | | | | | | | | | | | | | | | | 2 |
| 36 HF−1 | | | | 1 | | | | | | | | | | | | | | | | | | | | | | | | | | | | | 1 |
| 37 −1 | | | | | | | | | | | | | | | 1 | | | | | | | | | | | | | | | | | | 1 |
| 38 SETPHI | | 1 | 1 | | | | | | | | | | | | | | | | | | | | | | | | | | | | | | 5 |
| 39 PHI+− | | 1 | 1 | | | | | | | | | | | | | | | | | | | | | | | | | | | | | | 2 |
| 40 −25− | | | | | | | | | | | | | | | | | | 1 | 1 | 1 | | | | | | | | | | | | | 1 |
| 41 2IS− | | | | | | | | | | | | | | | | | | 1 | | 1 | | | | | | | | | | | | | 1 |
| 42 12S− | | | | | | | | | | | | | | | | | | | 1 | 1 | | | | | | | | | | | | | 1 |
| 43 M−SL | | 1 | | | | | | | | | | | | | | | | 1 | 1 | | | | | | | | | | | | | | 3 |
| 44 M+1 | | | | | | | | | | | | | | | | | | 1 | 1 | | | | | | | | | | | | | | * |
| 45 RESTST | | 1 | | | | | | | | | | | | | | | | 1 | | | | | | | | 1 | | | | | | 1 | 1 |

-continued
APPENDIX-IIA
PDP ROM Contents

| | | | | | | | | | | | |
|---|---|---|---|---|---|---|---|---|---|---|---|
| 46 SYNTST | | | | | | | | | | | |
| 47 HF+1 | | | | | | | | 1 | | | 1 |
| 48 M2I | | | | | | | | | | | 4 |
| 49 M−1 | | | | 1 | | | | | | | 2 |
| 50 MR | | | | 1 | | | | | | | 1 |
| 51 HF−2 | | | | | | | | | 1 | | 2 |
| 52 PR | | | 1 | | | | | | | | 1 |
| 53 DATDEC | | 1 | 1 | 1 | | 1 | 1 | | | | 1 |
| 54 ONES | 1 | 1 | 1 | 1 | | 1 | 1 | | | | 1 |
| 55 ZERO | 1 | 1 | 1 | 1 | | 1 | 1 | | | | 1 |
| 56 DATIN | | | | | 1 | | | | | | 5 |

468

*For Diagnostic Testing Only

HEXADECIMAL CODING FOR I-ROM

0000 = 0        1000 = 8
0001 = 1        1001 = 9
0010 = 2        1010 = A
0011 = 3        1011 = B
0100 = 4        1100 = C
0101 = 5        1101 = D
0110 = 6        1110 = E
0111 = 7        1111 = F

MISC
0 = NONE
8 = SEL F1(0)
    NEXT STEP

CLOCK SIGNALS
0 = NONE           8 = MU(D_i)
1 = STU A          9 = MU(M_r)
2 = STU B          A = OU(CLEAR), SEL KSC KMC NEXT STEP
3 = STU C          B = OU(STEP SCTR), MU(T_i)
4 = STU R, MU(AVG) C = OU(RESET TEST)
5 = STU A, MU(EK)  D = OU(SYNC TEST)
6 = MU(LPF_r)      E = OU(CORR TEST), MU(P_r)
7 = MU(VLPF_k)     F = OU(DATA DECISION)

SOURCE                              ALU
00 = F1, F2                         18 = 0
01 = (OR-SIGN) (|F1|, |F2|)         30 = A−B
02 = F1, F2 IF SL+                  31 = A−B IF SL−
     F1, −|F2| IF SL−                    A+B IF SL+
04 = F1, |F2|                       34 = A−B IF EPR = 0
10 = F1, SCALER                          A IF EPR = 1
40 = F1, MULT                       48 = A+B
48 = |F1|, MULT IF EPR = 0   4A = A+B IF SL−
     F1, F2 IF EPR = 1            B IF SL+
                                    60 = 2A
60 = F1, CROM                       D0 = B
80 = INPUT, F2                      E0 = LOGIC 1
                                    F8 = A

DESTINATION        SKIP/HOLD
0 = NONE           0 = NO SKIP/HOLD
2 = SL             1 = SKIP IF SL+
4 = F2             2 = SKIP IF SL−

-continued
APPENDIX-IIA
PDP ROM Contents

| | |
|---|---|
| 8 = F1 | 3 = SKIP IF K1 = 0xxx |
| 9 = F1, ΦL | 4 = SKIP IF K1 = xx0x |
| A = F1, SL | 5 = SKIP IF $N_c$ < K2 |
| B = F1, SL SET | 6 = SKIP IF $\overline{R}$ · $\overline{SEF}$ = 1 |
| C = F1, F2 | 7 = SKIP IF DRF = 1 |
| E = F1, F2, SL | 8 = HOLD ALU LATCH NEXT STEP |
| F = F1, F2, SL SET | |

PDP Program List
APPENDIX-IIB

| STEP | OPERATION | F1 | F2 | CROM | IROM | INSTR. |
|------|-----------|----|----|------|------|--------|
| 0 | $0 \to F_1(2), F_2(2), SL$ | 2 | 2 | 63 | 55 | ZERO |
| 1 | $0 \to F_1(2), F_2(2), SL$ | | | | | |
|   | (guard step for PCTR recycle) | | | | | |
| 2 | $F_1(2) \to F_1(2), F_2(2)$ | | | | 3 | EKCLIP |
|   | [CLK A TO STU][MU CLK $E_K$] | | | | | |
| 3 | $F_2(\overline{VLPF}) \to F_1(AVG)$ | 0 | 1 | | 12 | 21$K2 |
|   | (skip if Nc<K2) | | | | | |
| 4 | $F_1(AVG) - ROM(LSB) \to SL$ | | 63 | 35 | 13 | R−SL |
| 5 | $ROM(LSB) \to F_1(AVG)$ | | | | 14 | LSB |
|   | (SKIP IF SL+) | | | | | |
| 6 | $F_1(AVG) \to F_2(CL)$ | | 0 | 63 | 15 | 12 |
| 7 | $F_2(CL) \to F_1(CL)$ | 1 | | | 16 | 21 |
| 8 | $\|F_1(2)\| + ROM(K_4)F_2(2) \to F_1(2), F_2(2)$ if $\overline{EPR}$ | 2 | 2 | 55 | 8 | VLPF |
|   | $F_2(2) \to F_1(2), F_2(2)$ if EPR | | | | | |
|   | [MU CLK $VLPF_K$] | | | | | |
| 9 | $0 \to F_1(5), F_2(5), SL$ | 5 | 5 | 63 | 55 | ZERO |
| 10 | 1's $\to F_2(5)$ | | | | 54 | ONES |
| 11 | $F_2(2) \to F_1(2), F_2(2)$ if SL+ | 2 | 2 | | 11 | LPFSGN |
|    | $-\|F_2(2)\| \to F_1(2), F_2(2)$ if SL− | | | | | |
|    | [MU CLK $LPF_K$] | | | | | |
| 12 | $2F_1(CL) \to F_1(CL), F_2(CL)$, SET SL | 1 | 0 | | 17 | DBL |
| 13 | $2F_1(CL) \to F_1(CL), F_2(1)$, SET SL | | 1 | | | DBL$8 |
| 14 | $2F_1(CL) \to F_1(CL)$, SET SL | | | | 18 | DBL$8 |
|    | (skip if $K_1$=0xxx) | | | | | |
| 15 | $F_1(CL) + F_2(CL) \to F_1(CL)$, SET SL | | 0 | | 19 | +1$2 |
|    | (skip if $K_1$=xx0x) | | | | | |
| 16 | $\|F_2(5)\| \to F_1(CL)$ | | 5 | | 20 | FULSCL |
|    | (skip if SL+) | | | | | |
| 17 | $F_1(CL) \to F_2(CL)$ | | 0 | | 15 | 12 |
| 18 | $F_1(AVG) \to F_1(AVG)$ | 0 | | | 21 | CLR STU |
|    | [MU CLK AVG][STU CLK R] | | | | | |
| 19 | $\left(\begin{array}{c}\text{OR'ED}\\\text{SIGN}\end{array}\right)[\|F_1(LPF_1)\|+\|F_2(LPF_5)\|] \to SL$ | 33 | 37 | | 22 | STU/A |
|    | [DHOLD=1 NEXT STEP IF SIGN=0][STU CLK A] | | | | | |
| 20 | ALU LATCH $\to F_1(CP), \overline{F_2(CP)}$ IF DHOLD | 1 | 2 | | 23 | LCH 12 |
|    | 1's $\to F_1(CP)F_2(CP)$ IF $\overline{DHOLD}$ | | | | | |
| 21 | $F_1(PP) - F_2(CP) \to SL$ | 2 | | | 24 | STU/B |
|    | [STU CLK B] | | | | | |
| 22 | $F_2(CP) \to F_1(PP)$ | | | | 25 | 21$+ |
|    | (skip if SL+) | | | | | |
| 23 | | 34 | 38 | | 22 | STU/A |
| 24 | | 1 | 2 | | 23 | LCH12 |
| 25 | | 2 | | | 24 | STU/B |
| 26 | | | | | 25 | 21$+ |
| 27 | | 35 | 39 | | 22 | STU/A |
| 28 | | 1 | 2 | | 23 | LCH12 |
| 29 | | 2 | | | 24 | STU/B |
| 30 | | | | | 25 | 21$+ |
| 31 | | 36 | 40 | | 22 | STU/A |
| 32 | | 1 | 2 | | 23 | LCH12 |
| 33 | | 2 | | | 24 | STU/B |
| 34 | | | | | 25 | 21$+ |
| 35 | | 37 | 41 | | 22 | STU/A |
| 36 | | 1 | 2 | | 23 | LCH12 |
| 37 | | 2 | | | 24 | STU/B |
| 38 | | | | | 25 | 21$+ |
| 39 | | 38 | 42 | | 22 | STU/A |
| 40 | | 1 | 2 | | 23 | LCH12 |
| 41 | | 2 | | | 24 | STU/B |
| 42 | | | | | 25 | 21$+ |
| 43 | | 39 | 43 | | 22 | STU/A |
| 44 | | 1 | 2 | | 23 | LCH12 |
| 45 | | 2 | | | 24 | STU/B |
| 46 | | | | | 25 | 21$+ |
| 47 | | 40 | 44 | | 22 | STU/A |
| 48 | | 1 | 2 | | 23 | LCH12 |
| 49 | | 2 | | | 24 | STU/B |
| 50 | | | | | 25 | 21$+ |
| 51 | | 41 | 45 | | 22 | STU/A |
| 52 | | 1 | 2 | | 23 | LCH12 |
| 53 | | 2 | | | 24 | STU/B |
| 54 | | | | | 25 | 21$+ |
| 55 | | 42 | 46 | | 22 | STU/A |
| 56 | | 1 | 2 | | 23 | LCH12 |
| 57 | | 2 | | | 24 | STU/B |

-continued

PDP Program List
APPENDIX-IIB

| STEP | OPERATION | F1 | F2 | CROM | IROM | INSTR. |
|---|---|---|---|---|---|---|
| 58 | | | | | 25 | 21$+ |
| 59 | | 32 | 37 | | 22 | STU/A |
| 60 | | 1 | 2 | | 23 | LCH12 |
| 61 | | 2 | | | 24 | STU/B |
| 62 | | | | | 25 | 21$+ |
| 63 | | 33 | 38 | | 22 | STU/A |
| 64 | | 1 | 2 | | 23 | LCH12 |
| 65 | | 2 | | | 24 | STU/B |
| 66 | | | | | 25 | 21$+ |
| 67 | | 34 | 39 | | 22 | STU/A |
| 68 | | 1 | 2 | | 23 | LCH12 |
| 69 | | 2 | | | 24 | STU/B |
| 70 | | | | | 25 | 21$+ |
| 71 | | 35 | 40 | | 22 | STU/A |
| 72 | | 1 | 2 | | 23 | LCH12 |
| 73 | | 2 | | | 24 | STU/B |
| 74 | | | | | 25 | 21$+ |
| 75 | | 36 | 41 | | 22 | STU/A |
| 76 | | 1 | 2 | | 23 | LCH12 |
| 77 | | 2 | | | 24 | STU/B |
| 78 | | | | | 25 | 21$+ |
| 79 | | 37 | 42 | | 22 | STU/A |
| 80 | | 1 | 2 | | 23 | LCH12 |
| 81 | | 2 | | | 24 | STU/B |
| 82 | | | | | 25 | 21$+ |
| 83 | | 38 | 43 | | 22 | STU/A |
| 84 | | 1 | 2 | | 23 | LCH12 |
| 85 | | 2 | | | 24 | STU/B |
| 86 | | | | | 25 | 21$+ |
| 87 | | 39 | 44 | | 22 | STU/A |
| 88 | | 1 | 2 | | 23 | LCH12 |
| 89 | | 2 | | | 24 | STU/B |
| 90 | | | | | 25 | 21$+ |
| 91 | | 40 | 45 | | 22 | STU/A |
| 92 | | 1 | 2 | | 23 | LCH12 |
| 93 | | 2 | | | 24 | STU/B |
| 94 | | | | | 25 | 21$+ |
| 95 | | 41 | 46 | | 22 | STU/A |
| 96 | | 1 | 2 | | 23 | LCH12 |
| 97 | | 2 | | | 24 | STU/B |
| 98 | | | | | 25 | 21$+ |
| 99 | | 42 | 47 | | 22 | STU/A |
| 100 | | 1 | 2 | | 23 | LCH12 |
| 101 | | 2 | | | 24 | STU/B |
| 102 | | | | | 25 | 21$+ |
| 103 | | 32 | 38 | | 22 | STU/A |
| 104 | | 1 | 2 | | 23 | LCH12 |
| 105 | | 2 | | | 24 | STU/B |
| 106 | | | | | 25 | 21$+ |
| 107 | | 33 | 39 | | 22 | STU/A |
| 108 | | 1 | 2 | | 23 | LCH12 |
| 109 | | 2 | | | 24 | STU/B |
| 110 | | | | | 25 | 21$+ |
| 111 | | 34 | 40 | | 22 | STU/A |
| 112 | | 1 | 2 | | 23 | LCH12 |
| 113 | | 2 | | | 24 | STU/B |
| 114 | | | | | 25 | 21$+ |
| 115 | | 35 | 41 | | 22 | STU/A |
| 116 | | 1 | 2 | | 23 | LCH12 |
| 117 | | 2 | | | 24 | STU/B |
| 118 | | | | | 25 | 21$+ |
| 119 | | 36 | 42 | | 22 | STU/A |
| 120 | | 1 | 2 | | 23 | LCH12 |
| 121 | | 2 | | | 24 | STU/B |
| 122 | | | | | 25 | 21$+ |
| 123 | | 37 | 43 | | 22 | STU/A |
| 124 | | 1 | 2 | | 23 | LCH12 |
| 125 | | 2 | | | 24 | STU/B |
| 126 | | | | | 25 | 21$+ |
| 127 | | 38 | 44 | | 22 | STU/A |
| 128 | | 1 | 2 | | 23 | LCH12 |
| 129 | | 2 | | | 24 | STU/B |
| 130 | | | | | 25 | 21$+ |
| 131 | | 39 | 45 | | 22 | STU/A |
| 132 | | 1 | 2 | | 23 | LCH12 |
| 133 | | 2 | | | 24 | STU/B |
| 134 | | | | | 25 | 21$+ |
| 135 | | 40 | 46 | | 22 | STU/A |
| 136 | | 1 | 2 | | 23 | LCH12 |

-continued

PDP Program List
APPENDIX-IIB

| STEP | OPERATION | F1 | F2 | CROM | IROM | INSTR. |
|------|-----------|----|----|------|------|--------|
| 137 | | 2 | | | 24 | STU/B |
| 138 | | | | | 25 | 21$+ |
| 139 | | 41 | 47 | | 22 | STU/A |
| 140 | | 1 | 2 | | 23 | LCH12 |
| 141 | | 2 | | | 24 | STU/B |
| 142 | | | | | 25 | 21$+ |
| 143 | $0 \rightarrow F_1(3), F_2(3)$ [STU CLK C] | 3 | 3 | | 26 | STU/C |
| 144 | $0 \rightarrow F_1(T_{i-4}), F_2(T_{i-3})$ (SKIP IF $\overline{R} \cdot \overline{SEF} = 1$) | 10 | 10 | | 27 | CLRDR |
| 145 | $0 \rightarrow F_1(T_{i-2}), F_1(T_{i-1})$ (SKIP IF $\overline{R} \cdot \overline{SEF} = 1$) | 11 | 11 | | | |
| 146 | $0 \rightarrow F_1(M_{r-8}), F_2(M_{r-7})$ (SKIP IF $\overline{R} \cdot \overline{SEF} = 1$) | 12 | 12 | | | |
| 147 | $0 \rightarrow F_1(M_{r-6}), F_2(M_{r-5})$ (SKIP IF $\overline{R} \cdot \overline{SEF} = 1$) | 13 | 13 | | | |
| 148 | $0 \rightarrow F_1(M_{r-4}), F_2(M_{r-3})$ (SKIP IF $\overline{R} \cdot \overline{SEF} = 1$) | 14 | 14 | | | |
| 149 | $0 \rightarrow F_1(M_{r-2}), F_2(M_{r-1})$ (SKIP IF $\overline{R} \cdot \overline{SEF} = 1$) | 15 | 15 | | | |
| 150 | $0 \rightarrow F_1(7), F_2(Q_{i-1})$ (SKIP IF $\overline{R} \cdot \overline{SEF} = 1$) | 7 | 7 | | | |
| 151 | $0 \rightarrow F_1(P_{r-1}), F_2(6)$ (SKIP IF $\overline{R} \cdot \overline{SEF} = 1$) | 6 | 6 | | | |
| 152 | $F_2(M_{r-1}) \rightarrow SL$ [NEXT F1F2 ADDRESS FROM STU][OU CLK CLEAR] | | 15 | | 28 | CLROU |
| 153 | $F_1(E_{ks1}) - F_2(E_{Km1}) \rightarrow —$ [D HOLD = 1 NEXT STEP] | 16 | 16 | | 29 | $-$LCH |
| 154 | ALU LATCH$\rightarrow F_1(D_i), F_2(D_i)$ | 2 | 2 | | 23 | LCH 12 |
| 155 | $F_2(M_{r-1}) \rightarrow SL$ [NEXT F1F2 ADDRESS FROM STU][OU CLK CLEAR] | | 15 | | 28 | CLROU |
| 156 | $F_1(VLPF_{ks1}) + F_2(VLPF_{km1}) \rightarrow —$ [DHOLD = 1 NEXT STEP] | 48 | 48 | | 30 | +LCH |
| 157 | ALU LATCH $\rightarrow F_1(2L_i), F_2(2L_i)$ | 1 | 1 | | 23 | LCH 12 |
| 158 | $F_2(D_i) \rightarrow F_1(D_{i-4})$ (SKIP IF DRF = 1)[MU CLK $D_i$] | 8 | 2 | | 31 | DI |
| 159 | $F_1(D_{i-4}) \rightarrow F_2(D_{i-4})$ | | | | 15 | 12 |
| 160 | $F_1(3) - F_2(D_{i-4}) \rightarrow F_2(D_{i-4})$ | 3 | | | 32 | $-2$ |
| 161 | $F_2(D_{i-4}) \rightarrow F_1(D_{i-4})$ (SKIP IF SL +) | 8 | | | 25 | 21$+ |
| 162 | $F_1(T_{i-4}) \rightarrow F_2(T_{i-4})$ | 10 | | | 15 | 12 |
| 163 | $F_1(D_{i-4}) - F_2(T_{i-4}) \rightarrow F_2(\Delta T_{i-4})$ | 8 | | | 32 | $-2$ |
| 164 | $F_1(T_{i-4}) +$ ROM (K6) $F_2(\Delta T_{i-4}) \rightarrow F_2(T_i)$ | 10 | | 59 | 33 | M+2 |
| 165 | $F_2(T_i) \rightarrow F_1(T_i)$ | 4 | | 63 | 16 | 21 |
| 166 | $F_2(T_{i-3}) \rightarrow F_1(T_{i-4})$ | 10 | 10 | | | |
| 167 | $F_1(T_{i-2}) \rightarrow F_2(T_{i-3})$ | 11 | | | 15 | 12 |
| 168 | $F_2(T_{i-1}) \rightarrow F_1(T_{i-2})$ | | 11 | | 16 | 21 |
| 169 | $F_1(T_i) \rightarrow F_2(T_{i-1})$ | 4 | | | 15 | 12 |
| 170 | $F_2(D_{i-3}) \rightarrow F_1(D_{i-4})$ | 8 | 8 | | 16 | 21 |
| 171 | $F_1(D_{i-2}) \rightarrow F_2(D_{i-3})$ | 9 | | | 15 | 12 |
| 172 | $F_2(D_{i-1}) \rightarrow F_1(D_{i-2})$ | | 9 | | 16 | 21 |
| 173 | $F_1(D_i) \rightarrow F_2(D_{i-1})$ | 2 | | | 15 | 12 |
| 174 | $F_1(T_i) \rightarrow F_1(T_i)$ [MU CLK $T_i$][OU CLK STEP SCTR] | 4 | | | 34 | TI |
| 175 | $\frac{1}{2} F_2(T_{i-2}) \rightarrow F_1(Q_i)$ | 2 | 10 | | 35 | HF21 |
| 176 | $F_1(Q_i) - \frac{1}{2} F_2(T_i) \rightarrow F_1(Q_i)$ | | 11 | | 36 | HF$-1$ |
| 177 | $F_1(3) - F_2(Q_{i-1}) \rightarrow F_1(I_i)$ | 3 | 7 | | 37 | $-1$ |
| 178 | $F_1(Q_i) \rightarrow F_2(Q_i)$ | 2 | | | 15 | 12 |
| 179 | $F_1(Q_i) \rightarrow F_2(Q_i)$ | | 2 | | | |
| 180 | $F_1(I_i) \rightarrow F_2(I_i)$ | 3 | 1 | | | |
| 181 | $F_1(I_i) \rightarrow F_2(I_i)$ | | 3 | | | |
| 182 | ROM (32)$\rightarrow F_1(\phi)$, $\phi$LATCH | 7 | 63 | 37 | 38 | SETPHI |
| 183 | $F_1(5) - F_2(Q_i) \rightarrow SL$ | 5 | 2 | 63 | 10 | $-$SL |
| 184 | $F_1(\phi) +$ ROM (16)$\rightarrow F_1(\phi)$, $\phi$LATCH IF SL+ $F_1(\phi) -$ ROM (16)$\rightarrow F_1(\phi)$, $\phi$LATCH IF SL$-$ | 7 | 63 | 36 | 39 | PHI+$-$ |
| 185 | $F_1(5) - F_2(Q_i) \rightarrow F_2(|Q_i|)$ (SKIP IF SL$-$) | 5 | 2 | 63 | 40 | $-2$$$-$ |
| 186 | $F_1(5) - F_2(I_i) \rightarrow SL$ | | 3 | | 10 | $-$SL |
| 187 | $F_1(\phi) +$ ROM (8)$\rightarrow F_1(\phi)$, $\phi$LATCH IF SL+ $F_1(\phi) -$ ROM (8)$\rightarrow F_1(\phi)$, $\phi$LATCH IF SL$-$ | 7 | 63 | 35 | 39 | PHI+$-$ |
| 188 | $F_1(5) - F_2(I_i) \rightarrow F_2(|I_i|)$ (SKIP IF SL$-$) | 5 | 3 | 63 | 40 | $-2$$$-$ |
| 189 | $F_2(|Q_i|) \rightarrow F_1(|Q_i|)$ | 2 | 2 | | 16 | 21 |
| 190 | $F_2(|Q_i|) \rightarrow F_1(|Q_i|)$ | 3 | | | | |
| 191 | $F_1(|Q_i|) - F_2(|I_i|) \rightarrow SL$ | | 3 | | 10 | $-$SL |
| 192 | $F_1(\phi) +$ ROM (4)$\rightarrow F_1(\phi)$, $\phi$LATCH IF SL+ $F_1(\phi) -$ ROM (4)$\rightarrow F_1(\phi)$, $\phi$LATCH IF SL$-$ | 7 | 63 | 34 | 39 | PHI+$-$ |
| 193 | $F_2(|I_i|) \rightarrow F_1(S)$ (SKIP IF SL$-$) | 3 | 3 | 63 | 41 | 21$$-$ |

-continued
PDP Program List
APPENDIX-IIB

| STEP | OPERATION | F1 | F2 | CROM | IROM | INSTR. |
|---|---|---|---|---|---|---|
| 194 | $F_1(|Q_i|) \to F_2(L)$ (SKIP IF SL−) | 2 | | | 42 | 12$− |
| 195 | $F_1(S) − ROM (TAN\phi) F_2(L) \to SL$ | 3 | | 15 | 43 | M−SL |
| 196 | $F_1(\phi) + ROM (2) \to F_1(\phi)$, $\phi$LATCH IF SL+ $F_1(\phi) − ROM (2) \to F_1(\phi)$, $\phi$LATCH IF SL− | 7 | 63 | 33 | 39 | PHI+− |
| 197 | $F_1(S) − ROM (TAN\phi) F_2(L) \to SL$ | 3 | 3 | 15 | 43 | M−SL |
| 198 | $F_1(\phi) + ROM(1) \to F_1(\phi)$, $\phi$LATCH IF SL+ $F_1(\phi) − ROM(1) \to F_1(\phi)$, $\phi$LATCH IF SL− | 7 | 63 | 32 | 39 | PHI+− |
| 199 | $ROM (SIN\phi) F_2(Q_i) \to F_1(E_i)$ | 4 | 7 | 15 | 48 | M21 |
| 200 | $F_1(E_i) + ROM (COS\phi) F_2(I_i) \to F_2(E_i)$ | | 1 | 31 | 33 | M+2 |
| 201 | $F_1(2L_i) + F_2(2L_i)$ | 1 | 4 | 63 | 15 | 12 |
| 202 | $\frac{1}{2} F_2(2L_i) \to (F_1(L_i)$ | | | | 35 | HF21 |
| 203 | $F_1(L_i) − ROM (K7) F_2 (E_i) \to SL$ [OU CLK RESET TEST] | | 1 | 61 | 45 | RESTST |
| 204 | $0 \to F_1 (2), F_2(2)$ [OU CLK SYNC TEST] | 2 | 2 | 63 | 46 | SYNTST |
| 205 | $F_1(2) + \frac{1}{2} F_2(D_{i-2}) \to F_1 (\Delta D_i)$ | | 8 | | 47 | HF+1 |
| 206 | $F_1(\Delta D_i) − \frac{1}{2} F_2(D_i) \to F_1(\Delta D_i)$ | | 9 | | 36 | HF−1 |
| 207 | $F_1(\Delta D_i) \to F_2(\Delta D_i)$ | 2 | 4 | | 15 | 12 |
| 208 | $ROM (SIN\phi) F_2(\Delta D_i) \to F_1(M_r)$ | 3 | 9 | 15 | 48 | M21 |
| 209 | $0 \to F_1(2), F_2(2), SL$ | 2 | 2 | 63 | 55 | ZERO |
| 210 | $F_1(D_{i-3}) \to F_2(D_{i-3})$ | 8 | | | 15 | 12 |
| 211 | $F_1(2) + \frac{1}{2} F_2(D_{i-3}) \to F_1(\Delta D_{i-1})$ | 2 | | | 47 | HF+1 |
| 212 | $F_1(D_{i-1}) \to F_2(D_{i-1})$ | 9 | | | 15 | 12 |
| 213 | $F_1(\Delta D_{i-1}) − \frac{1}{2} F_2(D_{i-1}) \to F_2(\Delta D_{i-1})$ | 2 | | | 51 | HF−2 |
| 214 | $F_1(M_r) − ROM (COS\phi) F_2(\Delta D_{i-1}) \to F_1(M_r)$ | 3 | | 31 | 49 | M−1 |
| 215 | $F_1(M_r) \to F_2(M_r)$ [MU CLK Mr] | | 1 | 63 | 50 | MR |
| 216 | $F_1(M_{r-8}) \to F_2(M_{r-8})$ | 12 | 2 | | 15 | 12 |
| 217 | $\frac{1}{2} F_2(M_r) \to F_1(PC1)$ | 4 | 1 | | 35 | HF21 |
| 218 | $F_1(PC1) + \frac{1}{2} F_2(M_{r-8}) \to F_1(PC1)$ | | 2 | | 47 | HF+1 |
| 219 | $F_1(PC1) \to F_2(PC1)$ | | 3 | | 15 | 12 |
| 220 | $\frac{1}{2} F_2(M_{r-1}) \to F_1(PC2)$ | 4 | 15 | | 35 | HF21 |
| 221 | $F_1(PC2) − \frac{1}{2} F_2(PC1) \to F_2(PC3)$ | | 3 | | 51 | HF−2 |
| 222 | $F_1(P_{r-1}) + \frac{1}{2} F_2 (PC3) \to F_1(P_r)$ | 6 | | | 47 | HF+1 |
| 223 | $F_1(P_r) \to F_2(P_r)$ | | | | 15 | 12 |
| 224 | $F_2(M_{r-7}) \to F_1(M_{r-8})$ | 12 | 12 | | 16 | 21 |
| 225 | $F_1(M_{r-6}) \to F_2(M_{r-7})$ | 13 | | | 15 | 12 |
| 226 | $F_2(M_{r-5}) \to F_1(M_{r-6})$ | | 13 | | 16 | 21 |
| 227 | $F_1(M_{r-4}) \to F_2(M_{r-5})$ | 14 | | | 15 | 12 |
| 228 | $F_2(M_{r-3}) \to F_1(M_{r-4})$ | | 14 | | 16 | 21 |
| 229 | $F_1(M_{r-2}) \to F_2(M_{r-3})$ | 15 | | | 15 | 12 |
| 230 | $F_2(M_{r-1}) \to F_1(M_{r-2})$ | | 15 | | 16 | 21 |
| 231 | $F_1(M_r) \to F_2(M_{r-1})$ | 3 | | | 15 | 12 |
| 232 | $F_1(L_i) − ROM (K8) F_2(P_r) \to SL$ | 1 | 3 | 63 | 43 | M−SL |
| 233 | $F_2(P_r) \to F_2(P_r)$ [MU CLK $P_r$] [OU CLK CORRELATOR TEST] | | | 63 | 52 | PR |
| 234 | $F_1(M_r) \to Sl$ [OU CLK DATA DECISION] | 3 | | | 53 | DATDEC |
| 235 | NO OPERATION | 63 | 63 | | 0 | IDLE |
| . . . | | | | | | |
| 274 | NO OPERATION | | | | | |
| 275 | $0 \to F_1(1), F_2(1), SL$ | 1 | 1 | 63 | 55 | ZERO |
| 276 | INPUT $(E_0) − F_2(CL) \to F_1(E_0 − CL), SL$ STEP $N_C$ IF− | 16 | 0 | | 1 | INPUT |
| 277 | $F_1(E_0) + F_2(CL) \to F_1(E_0)$ if SL− $F_2(CL) \to F_1(E_0)$ if SL+ | | | | 2 | CLIP |
| 278 | $F_1(E_0) \to F_2(E_0)$ [CLK A TO STU] [MU CLK EK] | | 16 | | 3 | EKCLIP |
| 279 | $F_1 (VLPF_0) − F_2 (\overline{VLPF}) \to F_2 (\Delta \overline{VLPF})$ (SKIP IF SL+) | 48 | 1 | | 4 | −2$+ |
| 280 | $F_1(\overline{VLPF}) − ROM \left(\frac{1}{NC}\right) F_2 (\Delta VLPF) \to F_1, F_2$ | 1 | | | 51 | 5 | M−12$+ |
| 281 | $F_1(E_0) − |F_2(LPF_0)| \to F_2(\Delta LPF_0)$ IF $\overline{EPR}$ $F_1(AVG) \to F_2(AVG)$ IF EPR | 16 | 32 | 63 | 6 | EPR |
| 282 | $|F_1(LPF_0)| + ROM (K_3) F_2 (\Delta LPF_0) \to F_1, F_2$ if $\overline{EPR}$ $F_2 (AVG) \to F_1, F_2$ IF EPR [$F_{1(0)}$ NEXT STEP IF EPR] | 32 | | | 53 | 7 | LPF |
| 283 | $F_1(E_0) − |F_2(VLPF_0)| \to F_2 (\Delta VLPF_0)$ if $\overline{EPR}$ $F_1(AVG) \to F_2 (\Delta VLPF_0)$ if EPR | 16 | 48 | 63 | 6 | EPR |
| 284 | $|F_1(VLPF_0)| + ROM (K_4) F_2 (\Delta VLPF_0) \to F_1, F_2$ | 48 | | | 55 | 8 | VLPF |

-continued

PDP Program List
APPENDIX-IIB

| STEP | OPERATION | F1 | F2 | CROM | IROM | INSTR. |
|---|---|---|---|---|---|---|
|  | if $\overline{EPR}$ |  |  |  |  |  |
|  | $\quad F_2\,(AVG) \rightarrow F_1, F_2$ if EPR |  |  |  |  |  |
|  | $\quad [MU\ CLK\ VLPFK]$ |  |  |  |  |  |
| 285 | $F_1(VLPF_0) + ROM\,(K5) \rightarrow F_2(THD_0)$ |  | 2 | 57 | 9 | R+2 |
| 286 | $F_1(LPF_0) - F_2(THD_0) \rightarrow SL$ | 32 |  | 63 | 10 | −SL |
| 287 | $F_2(LPF_0) \rightarrow F_1(LPF_0),\ F_2(LPF_0)$ if SL+ |  | 32 |  | 11 | LPFSGN |
|  | $-|F_2(LPF_0)| \rightarrow F_1(LPF_0),\ F_2(LPF_0)$ if SL− |  |  |  |  |  |
|  | $[MU\ CLK\ LPFK]$ |  |  |  |  |  |
| 288 |  | 17 | 0 |  | 1 | INPUT |
| 289 |  |  |  |  | 2 | CLIP |
| 290 |  |  | 17 |  | 3 | EKCLIP |
| 291 |  | 49 | 1 |  | 4 | −2S+ |
| 292 |  | 1 |  | 51 | 5 | M−12S+ |
| 293 |  | 17 | 33 | 63 | 6 | EPR |
| 294 |  | 33 |  | 53 | 7 | LPF |
| 295 |  | 17 | 49 | 63 | 6 | EPR |
| 296 |  | 49 |  | 55 | 8 | VLPF |
| 297 |  |  | 2 | 57 | 9 | R+2 |
| 298 |  | 33 |  | 63 | 10 | −SL |
| 299 |  |  | 33 |  | 11 | LPFSGN |
| 300 |  | 18 | 0 |  | 1 | INPUT |
| 301 |  |  |  |  | 2 | CLIP |
| 302 |  |  | 18 |  | 3 | EKCLIP |
| 303 |  | 50 | 1 |  | 4 | −2S+ |
| 304 |  | 1 |  | 51 | 5 | M−12S+ |
| 305 |  | 18 | 34 | 63 | 6 | EPR |
| 306 |  | 34 |  | 53 | 7 | LPF |
| 307 |  | 18 | 50 | 63 | 6 | EPR |
| 308 |  | 50 |  | 55 | 8 | VLPF |
| 309 |  |  | 2 | 57 | 9 | R+2 |
| 310 |  | 34 |  | 63 | 10 | −SL |
| 311 |  |  | 34 |  | 11 | LPFSGN |
| 312 |  | 19 | 0 |  | 1 | INPUT |
| 313 |  |  |  |  | 2 | CLIP |
| 314 |  |  | 19 |  | 3 | EKCLIP |
| 315 |  | 51 | 1 |  | 4 | −2S+ |
| 316 |  | 1 |  | 51 | 5 | M−12S+ |
| 317 |  | 19 | 35 | 63 | 6 | EPR |
| 318 |  | 35 |  | 53 | 7 | LPF |
| 319 |  | 19 | 51 | 63 | 6 | EPR |
| 320 |  | 51 |  | 55 | 8 | VLPF |
| 321 |  |  | 2 | 57 | 9 | R+2 |
| 322 |  | 35 |  | 63 | 10 | −SL |
| 323 |  |  | 35 |  | 11 | LPFSGN |
| 324 |  | 20 | 0 |  | 1 | INPUT |
| 325 |  |  |  |  | 2 | CLIP |
| 326 |  |  | 20 |  | 3 | EKCLIP |
| 327 |  | 52 | 1 |  | 4 | −2S+ |
| 328 |  | 1 |  | 51 | 5 | M−12S+ |
| 329 |  | 20 | 36 | 63 | 6 | EPR |
| 330 |  | 36 |  | 53 | 7 | LPF |
| 331 |  | 20 | 52 | 63 | 6 | EPR |
| 332 |  | 52 |  | 55 | 8 | VLPF |
| 333 |  |  | 2 | 57 | 9 | R+2 |
| 334 |  | 36 |  | 63 | 10 | −SL |
| 335 |  |  | 36 |  | 11 | LPFSGN |
| 336 |  | 21 | 0 |  | 1 | INPUT |
| 337 |  |  |  |  | 2 | CLIP |
| 338 |  |  | 21 |  | 3 | EKCLIP |
| 339 |  | 53 | 1 |  | 4 | −2S+ |
| 340 |  | 1 |  | 51 | 5 | M−12S+ |
| 341 |  | 21 | 37 | 63 | 6 | EPR |
| 342 |  | 37 |  | 53 | 7 | LPF |
| 343 |  | 21 | 53 | 63 | 6 | EPR |
| 344 |  | 53 |  | 55 | 8 | VLPF |
| 345 |  |  | 2 | 57 | 9 | R+2 |
| 346 |  | 37 |  | 63 | 10 | −SL |
| 347 |  |  | 37 |  | 11 | LPFSGN |
| 348 |  | 22 | 0 |  | 1 | INPUT |
| 349 |  |  |  |  | 2 | CLIP |
| 350 |  |  | 22 |  | 3 | EKCLIP |
| 351 |  | 54 | 1 |  | 4 | −2S+ |
| 352 |  | 1 |  | 51 | 5 | M−12S+ |
| 353 |  | 22 | 38 | 63 | 6 | EPR |
| 354 |  | 38 |  | 53 | 7 | LPF |
| 355 |  | 22 | 54 | 63 | 6 | EPR |
| 356 |  | 54 |  | 55 | 8 | VLPF |
| 357 |  |  | 2 | 57 | 9 | R+2 |

-continued

PDP Program List
APPENDIX-IIB

| STEP | OPERATION | F1 | F2 | CROM | IROM | INSTR. |
|---|---|---|---|---|---|---|
| 358 | | 38 | | 63 | 10 | −SL |
| 359 | | | 38 | | 11 | LPFSGN |
| 360 | | 23 | 0 | | 1 | INPUT |
| 361 | | | | | 2 | CLIP |
| 362 | | | 23 | | 3 | EKCLIP |
| 363 | | 55 | 1 | | 4 | −2$+ |
| 364 | | 1 | | 51 | 5 | M−12$+ |
| 365 | | 23 | 39 | 63 | 6 | EPR |
| 366 | | 39 | | 53 | 7 | LPF |
| 367 | | 23 | 55 | 63 | 6 | EPR |
| 368 | | 55 | | 55 | 8 | VLPF |
| 369 | | | 2 | 57 | 9 | R+2 |
| 370 | | 39 | | 63 | 10 | −SL |
| 371 | | | 39 | | 11 | LPFSGN |
| 372 | | 24 | 0 | | 1 | INPUT |
| 373 | | | | | 2 | CLIP |
| 374 | | | 24 | | 3 | EKCLIP |
| 375 | | 56 | 1 | | 4 | −2$+ |
| 376 | | 1 | | 51 | 5 | M−12$+ |
| 377 | | 24 | 40 | 63 | 6 | EPR |
| 378 | | 40 | | 53 | 7 | LPF |
| 379 | | 24 | 56 | 63 | 6 | EPR |
| 380 | | 56 | | 55 | 8 | VLPF |
| 381 | | | 2 | 57 | 9 | R+2 |
| 382 | | 40 | | 63 | 10 | −SL |
| 383 | | | 40 | | 11 | LPFSGN |
| 384 | | 25 | 0 | | 1 | INPUT |
| 385 | | | | | 2 | CLIP |
| 386 | | | 25 | | 3 | EKCLIP |
| 387 | | 57 | 1 | | 4 | −2$+ |
| 388 | | 1 | | 51 | 5 | M−12$+ |
| 389 | | 25 | 41 | 63 | 6 | EPR |
| 390 | | 41 | | 53 | 7 | LPF |
| 391 | | 25 | 57 | 63 | 6 | EPR |
| 392 | | 57 | | 55 | 8 | VLPF |
| 393 | | | 2 | 57 | 9 | R+2 |
| 394 | | 41 | | 63 | 10 | −SL |
| 395 | | | 41 | | 11 | LPFSGN |
| 396 | | 26 | 0 | | 1 | INPUT |
| 397 | | | | | 2 | CLIP |
| 398 | | | 26 | | 3 | EKCLIP |
| 399 | | 58 | 1 | | 4 | −2$+ |
| 400 | | 1 | | 51 | 5 | M−12$+ |
| 401 | | 26 | 42 | 63 | 6 | EPR |
| 402 | | 42 | | 53 | 7 | LPF |
| 403 | | 26 | 58 | 63 | 6 | EPR |
| 404 | | 58 | | 55 | 8 | VLPF |
| 405 | | | 2 | 57 | 9 | R+2 |
| 406 | | 42 | | 63 | 10 | −SL |
| 407 | | | 42 | | 11 | LPFSGN |
| 408 | | 27 | 0 | | 1 | INPUT |
| 409 | | | | | 2 | CLIP |
| 410 | | | 27 | | 3 | EKCLIP |
| 411 | | 59 | 1 | | 4 | −2$+ |
| 412 | | 1 | | 51 | 5 | M−12$+ |
| 413 | | 27 | 43 | 63 | 6 | EPR |
| 414 | | 43 | | 53 | 7 | LPF |
| 415 | | 27 | 59 | 63 | 6 | EPR |
| 416 | | 59 | | 55 | 8 | VLPF |
| 417 | | | 2 | 57 | 9 | R+2 |
| 418 | | 43 | | 63 | 10 | −SL |
| 419 | | | 43 | | 11 | LPFSGN |
| 420 | | 28 | 0 | | 1 | INPUT |
| 421 | | | | | 2 | CLIP |
| 422 | | | 28 | | 3 | EKCLIP |
| 423 | | 60 | 1 | | 4 | −2$+ |
| 424 | | 1 | | 51 | 5 | M−12$+ |
| 425 | | 28 | 44 | 63 | 6 | EPR |
| 426 | | 44 | | 53 | 7 | LPF |
| 427 | | 28 | 60 | 63 | 6 | EPR |
| 428 | | 60 | | 55 | 8 | VLPF |
| 429 | | | 2 | 57 | 9 | R+2 |
| 430 | | 44 | | 63 | 10 | −SL |
| 431 | | | 44 | | 11 | LPFSGN |
| 432 | | 29 | 0 | | 1 | INPUT |
| 433 | | | | | 2 | CLIP |
| 434 | | | 29 | | 3 | EKCLIP |
| 435 | | 61 | 1 | | 4 | −2$+ |
| 436 | | 1 | | 51 | 5 | M−12$+ |

-continued

PDP Program List
APPENDIX-IIB

| STEP | OPERATION | F1 | F2 | CROM | IROM | INSTR. |
|---|---|---|---|---|---|---|
| 437 | | 29 | 45 | 63 | 6 | EPR |
| 438 | | 45 | | 53 | 7 | LPF |
| 439 | | 29 | 61 | 63 | 6 | EPR |
| 440 | | 61 | | 55 | 8 | VLPF |
| 441 | | | 2 | 57 | 9 | R+2 |
| 442 | | 45 | | 63 | 10 | −SL |
| 443 | | | 45 | | 11 | LPFSGN |
| 444 | | 30 | 0 | | 1 | INPUT |
| 445 | | | | | 2 | CLIP |
| 446 | | | 30 | | 3 | EKCLIP |
| 447 | | 62 | 1 | | 4 | −2$+ |
| 448 | | 1 | | 51 | 5 | M−12$+ |
| 449 | | 30 | 46 | 63 | 6 | EPR |
| 450 | | 46 | | 53 | 7 | LPF |
| 451 | | 30 | 62 | 63 | 6 | EPR |
| 452 | | 62 | | 55 | 8 | VLPF |
| 453 | | | 2 | 57 | 9 | R+2 |
| 454 | | 46 | | 63 | 10 | −SL |
| 455 | | | 46 | | 11 | LPFSGN |
| 456 | | 31 | 0 | | 1 | INPUT |
| 457 | | | | | 2 | CLIP |
| 458 | | | 31 | | 3 | EKCLIP |
| 459 | | 63 | 1 | | 4 | −2$+ |
| 460 | | 1 | | 51 | 5 | M−12$+ |
| 461 | | 31 | 47 | 63 | 6 | EPR |
| 462 | | 47 | | 53 | 7 | LPF |
| 463 | | 31 | 63 | 63 | 6 | EPR |
| 464 | | 63 | | 55 | 8 | VLPF |
| 465 | | | 2 | 57 | 9 | R+2 |
| 466 | | 47 | | 63 | 10 | −SL |
| 467 | | | 47 | | 11 | LPFSGN |

A blank means use previous entry.

APPENDIX-IIC

PDP Configurations By Instruction Type

0. [IDLE]
No Operation

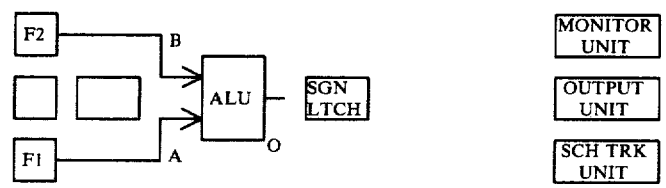

MU: = Monitor Unit
OU: = Output Unit
STU: = Sch Trk Unit

1. [INPUT]
INPUT − F2⟶F1, SL
Step $N_c$ if −

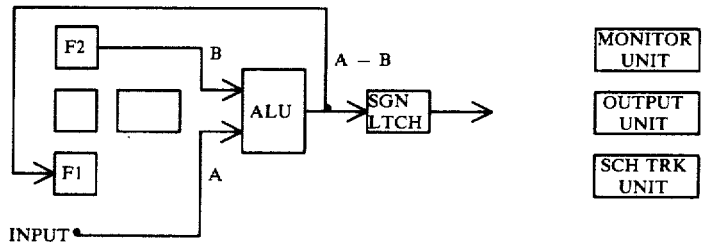

MU:
OU: Step $N_c$
STU:

2. [CLIP]
F1 + F2⟶F1 if SL−
F2⟶F1 if SL+

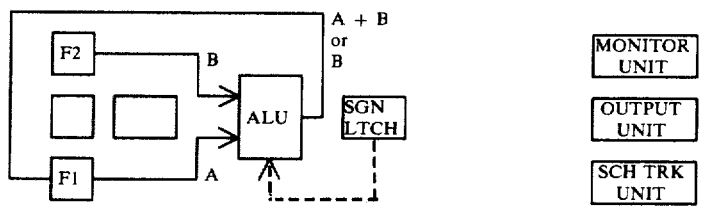

MU:
OU:
STU:

APPENDIX-IIC-continued

3.
$\boxed{\text{EKCLIP}}$
F1 $\longrightarrow$ F2
[MU CLK EK]

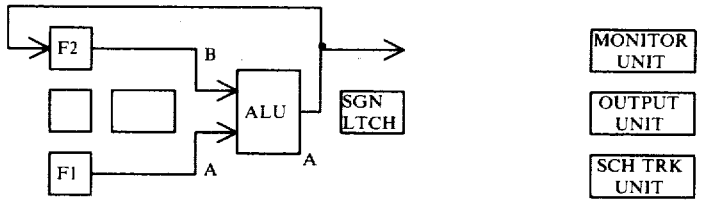

MU: STROBE $E_k$
OU:
STU:

4.
$\boxed{-28+}$
F1 − F2 $\longrightarrow$ F2 if SL−
No operation if SL+

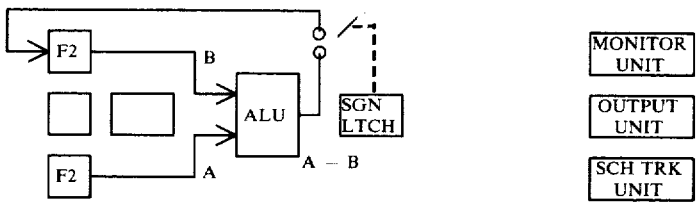

MU:
OU:
STU:

5.
$\boxed{M-128+}$
F1 − (ROM)F2 $\longrightarrow$ F1, F2
if SL−
No operation if SL+

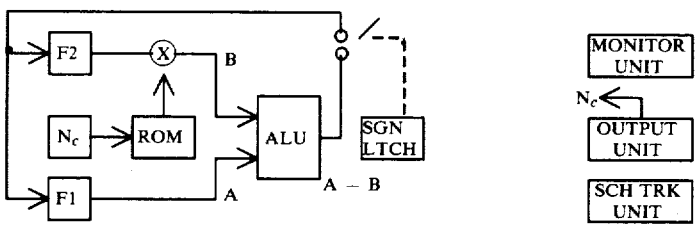

MU:
OU: Indirect ROM address
STU:

6.
$\boxed{\text{EPR}}$
F1 − |F2| $\longrightarrow$ F2 if $\overline{\text{EPR}}$
F1 $\longrightarrow$ F2 if EPR

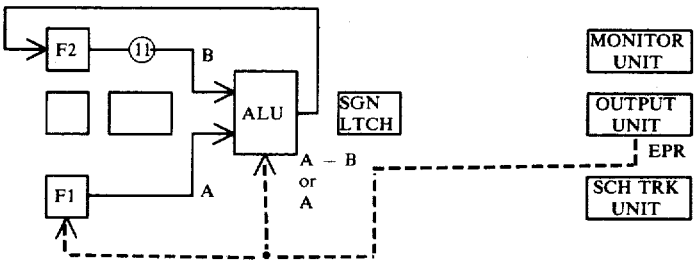

MU:
OU: Override ALU OPN,
STU: F1 address

7.
$\boxed{\text{LPF}}$
|F1| + (ROM) F2 $\longrightarrow$ F1,
F2 if $\overline{\text{EPR}}$
F2 $\longrightarrow$ F1,F2 if EPR

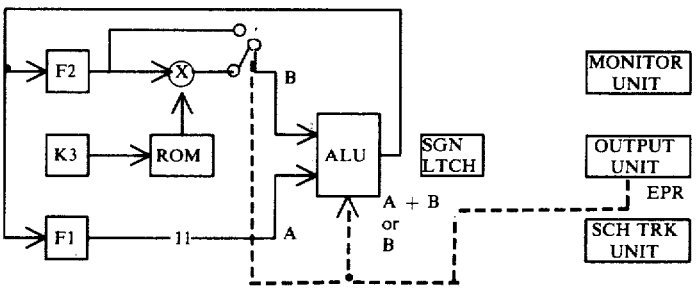

MU:
OU: Override Source B,
 ALU OPN.
STU:

8.
$\boxed{\text{VLPF}}$
|F1| + (ROM)F2 $\longrightarrow$ F1, F2
if $\overline{\text{EPR}}$
F2 $\longrightarrow$ F1, F2 if EPR
[MU CLK VLPFK]

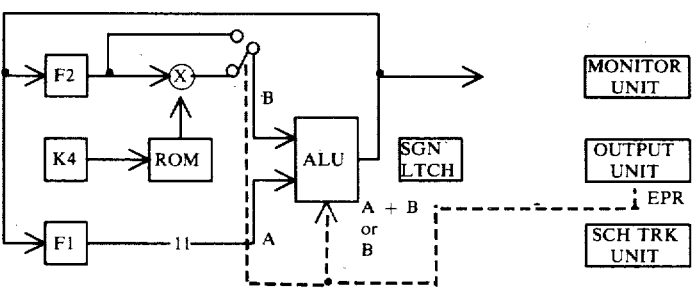

MU: STROBE $VLPF_k$
OU: Override Source B, ALU OPN.
STU:

APPENDIX-IIC-continued
9. $\boxed{R+2}$
F1 + ROM ⟶ F2
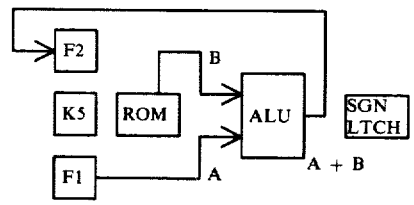
MU:
OU:
STU:
10. $\boxed{-SL}$
F1 − F2 ⟶ SL
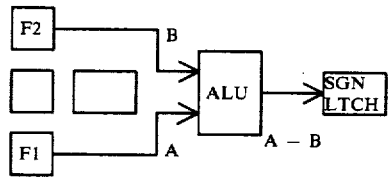
MU:
OU:
STU:
11. $\boxed{LPFSGN}$
F2 ⟶ F1, F2 if SL+
− |F2| ⟶ F1, F2 if SL−
[MU CLK LPFK]
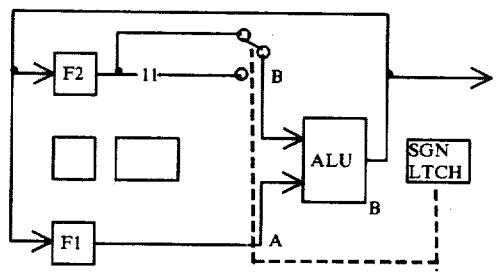
MU: STROBE $LPF_k$
OU:
STU:
12. $\boxed{≥K2}$
F2 ⟶ F1 if $N_c ≥ K2$
No operation if
$N_c < K2$
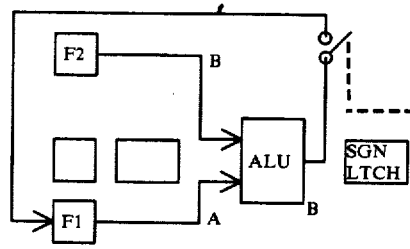
MU:
OU: Compare $N_c$ to K2
STU:
13. $\boxed{R-SL}$
F1 − ROM ⟶ SL
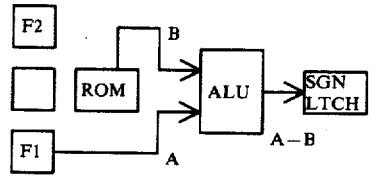
MU:
OU:
STU:
14. $\boxed{LSB}$
ROM ⟶ F1 if SL−
No operation if SL+
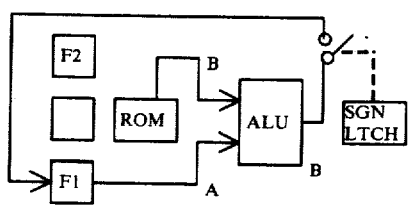
MU:
OU:
STU:

APPENDIX-IIC-continued
15. [12]
F1⟶F2
MU:
OU:
STU:
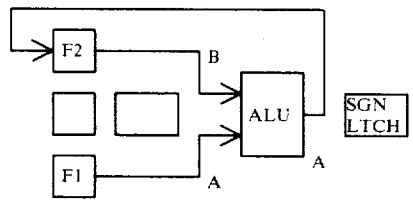
16. [21]
F2⟶F1
MU:
OU:
STU:
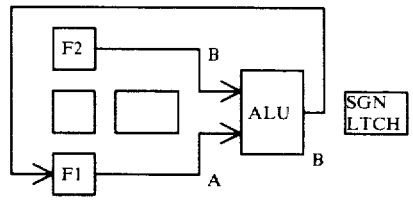
17. [DBL]
2 F1⟶F1, F2
[SET SL]
MU:
OU:
STU:
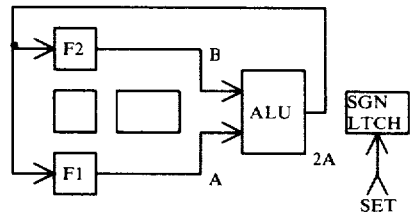
18. [DBL 88]
2F1⟶F1, SET SL,
if K1 ≠ OXXX
No operation if
kL = OXXX
MU:
OU: DECODE K1
STU:
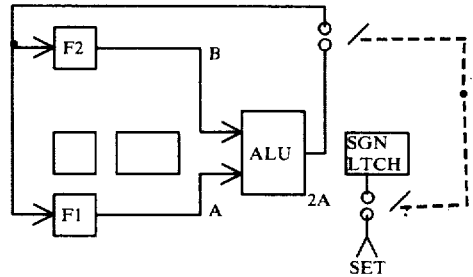
19. [+182]
F1 + F2⟶F1 if
K1 ≠ XXOX
No operation if
K1 = XXOX
MU:
OU: DECODE K1
STU:
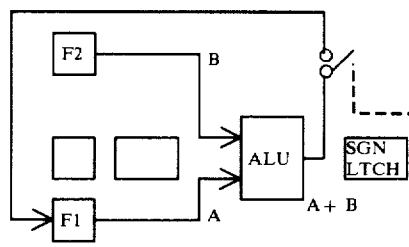
20. [FULSCL]
|F2|⟶F1 if SL−
No operation if SL+
MU:
OU:
STU:
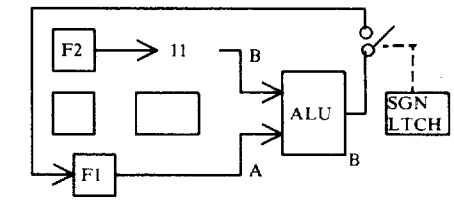

APPENDIX-IIC-continued

21. $\boxed{\text{CLRSTU}}$

F1 → F1

$\begin{bmatrix} \text{MU CLK AVG} \\ \text{STU CLK R} \end{bmatrix}$

MU: STROBE AVG
OU:
STU: Unconditional $(KS,KM)_B \rightarrow (O,O)$
 Conditional $(KS,KM)_C \rightarrow (O,O)$

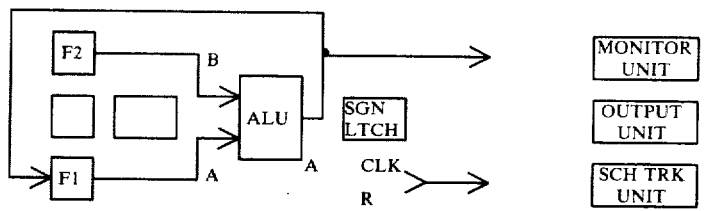

22. $\boxed{\text{STU/A}}$ $\begin{bmatrix} \text{OR'ED} \\ \text{SIGN} \end{bmatrix} [\,|F1| + |F2|\,] \rightarrow$ SL
 ALU
 LTCH

[STU CLK A]

MU:
OU:
STU: Unconditional
 $(KS,KM)_A =$
 $(KS,KM)$

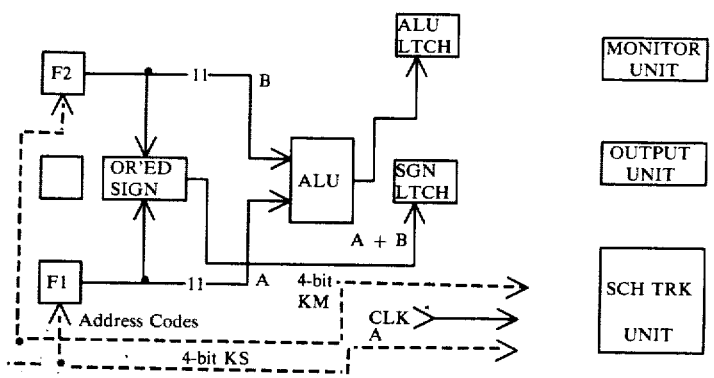

23. $\boxed{\text{LCH 12}}$

ALU LATCH → F1, F2 if SL+
1's → F1, F2 if SL−

MU:
OU:
STU:

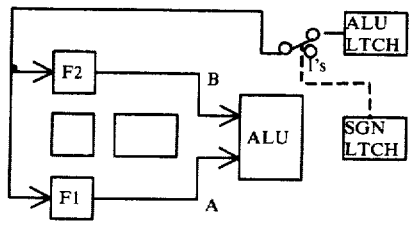

24. $\boxed{\text{STU/B}}$

F1−F2 → SL
[STU CLK B]

MU:
OU:
STU: Conditional
 $(KS,KM)_B = (KS,KM)_A$

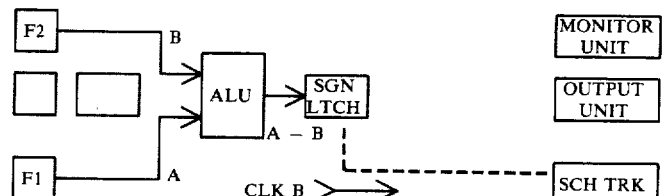

25. $\boxed{21\ S+}$

F2 → F1 if SL−
No operation if
SL+

MU:
OU:
STU:

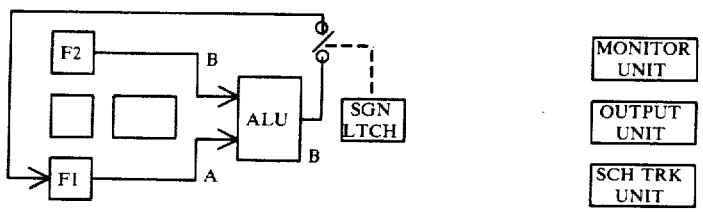

APPENDIX-IIC-continued

26. STU/C
    $O \longrightarrow F1, F2$
    [STU CLK C]

MU:
    OU:
    STU: Conditional
    $(KS,KM)_C = (KS,KM)_B$

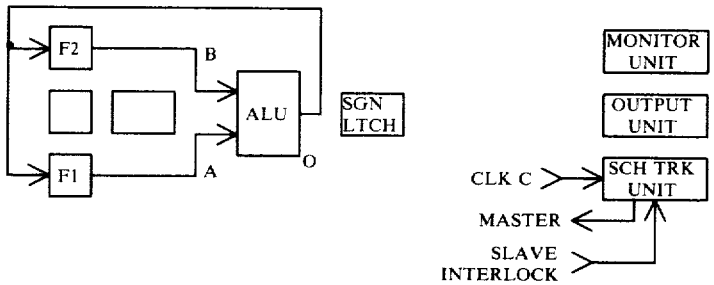

27. CLRDR
    $O \longrightarrow F1, F2$ if $\overline{R} \cdot \overline{SEF} = O$
    No operation if
    $\overline{R} \cdot \overline{SEF} = 1$ MU: $\overline{R} \cdot \overline{SEF}$ (execute only
    OU: in RESET or SEARCH
    STU: Mode).

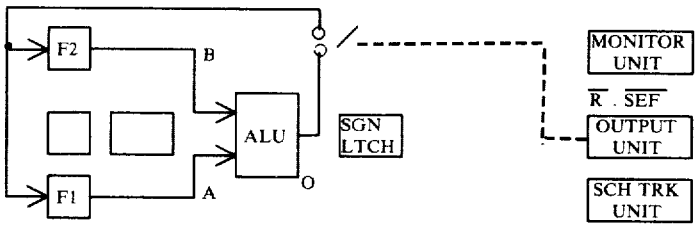

28. CLROU
    $F2 \longrightarrow SL$
    [OU CLK CLEAR]

MU:
    OU: Conditional
    STU: Reset of Latches

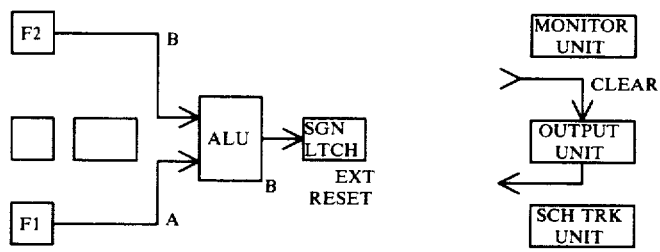

29. −LCH
    $F1 - F2 \longrightarrow$ ALU LATCH

MU:
    OU:
    STU: Indirect
        File Address

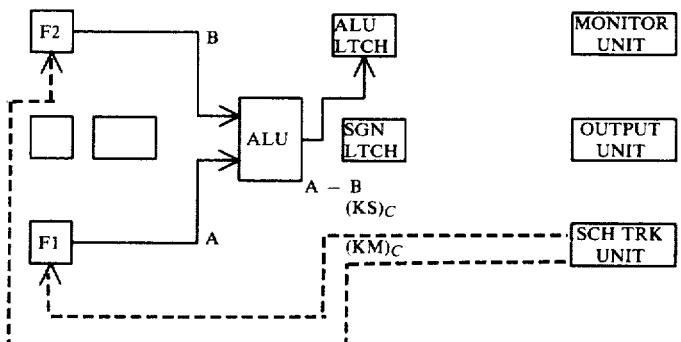

30. +LCH
    $F1 + F2 \longrightarrow$ ALU LATCH

MU:
    OU:
    STU: Indirect
        File Address

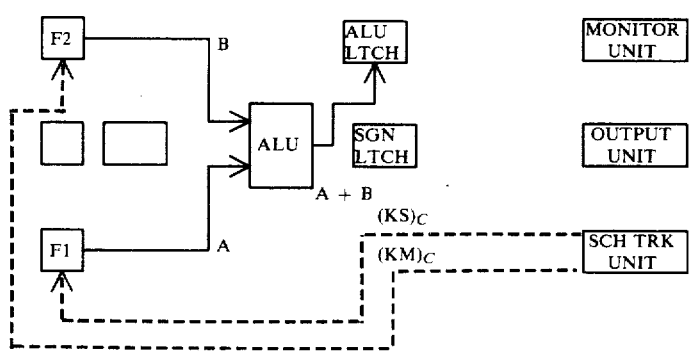

APPENDIX-IIC-continued

31. [DI]
F2 ⟶ F1 if DRF
No operation if DRF
[MU CLK DI]

MU: STROBE D_i
OU: DRF FLAG
STU:

32. [−2]
F1 − F2 ⟶ F2

MU:
OU:
STU:

33. [M + 2]
F1 + (ROM)F2 ⟶ F2

MU:
OU:
STU:

34. [TI]
F1 ⟶ F1
$\begin{bmatrix} \text{MU CLK TI} \\ \text{OU CLK SCTR} \end{bmatrix}$ MU: STROBE T_i
OU: STEP SYNC COUNTER
STU:

35. [HF21]
½ F2 ⟶ F1

MU:
OU:
STU:

36. [HF-1]
F1 − ½F2 ⟶ F1

MU:
OU:
STU:

APPENDIX-IIC-continued
37. $\boxed{-1}$
F1 − F2 ⟶ F1
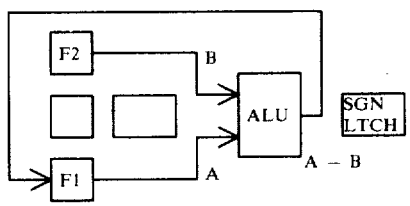
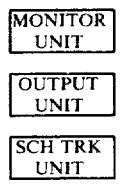
MU:
OU:
STU:
38. $\boxed{\text{SETPHI}}$
ROM ⟶ F1, φLCH
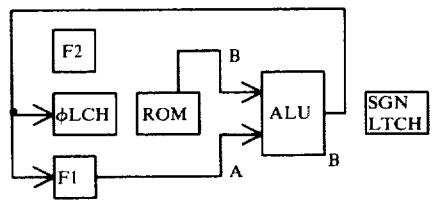
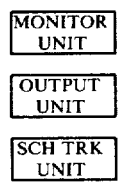
MU:
OU:
STU:
39. $\boxed{\text{PHI}+-}$
F1 + ROM ⟶ F1, φLCH
if SL+
F1 − ROM ⟶ F1, φLCH
if SL−
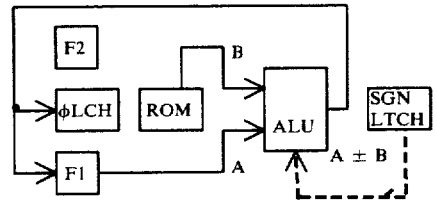
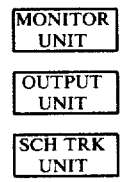
MU:
OU:
STU:
40. $\boxed{-2S-}$
F1 − F2 ⟶ F2 if SL+
No operation if SL−
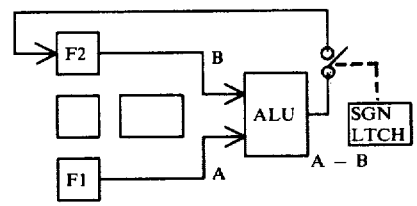
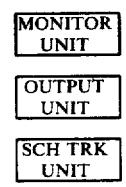
MU:
OU:
STU:
41. $\boxed{21S-}$
F2 ⟶ F1 if SL+
No operation if SL−
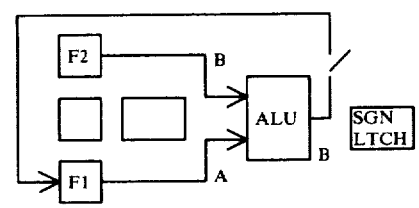
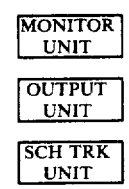
MU:
OU:
STU:
42. $\boxed{12S-}$
F1 ⟶ F2 if SL+
No operation if SL−
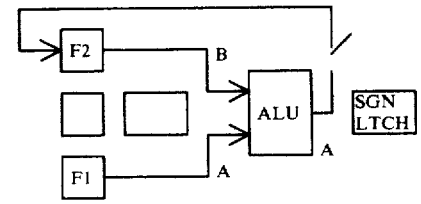
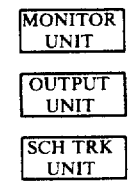
MU:
OU:
STU:

APPENDIX-IIC-continued

43. M − SL
F1 − (ROM)F2 ⟶ SL

MU:
OU:
STU:

44. M + 1
F1 + (ROM)F2 ⟶ F1

MU:
OU:
STU:

45. RESTST
F1 − (ROM)F2 ⟶ SL
[OU CLK RESET TEST]

MU:
OU: Test Receipt of
STU: External Reset

46. SYNTST
0 ⟶ F1, F2
[OU CLK SYNC TEST]

MU:
OU: Test for Φ in
STU: Sync Spector

47. HF + 1
F1 + ½F2 ⟶ F1

MU:
OU:
STU:

48. M21
(ROM)F2 ⟶ F1

MU:
OU:
STU:

APPENDIX-IIC-continued

49. $\boxed{M-1}$
F1 − (ROM)F2 ⟶ F1

MU:
OU:
STU:

50. $\boxed{MR}$
F1 ⟶ F2
[MU CLK MR]

MU: STROBE M$_r$
OU:
STU:

51. $\boxed{HF-2}$
F1 − ½F2 ⟶ F2

MU:
OU:
STU:

52. $\boxed{PR}$
F2 ⟶ F2
[MU CLK PR]

MU: STROBE P$_r$
OU:
STU:

53. $\boxed{DATDEC}$
F1 ⟶ SL
[OU CLK DAT DEC]

MU:
OU: Decide Mark or Space,
STU: External Data Out

54. $\boxed{ONES}$
1's ⟶ F2

MU:
OU:
STU:

APPENDIX-IIC-continued
55. 
    $O \longrightarrow F1, F2$
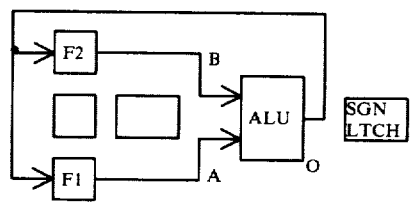
MU:
OU:
STU:
56. 
    INPUT $\longrightarrow F1, F2$
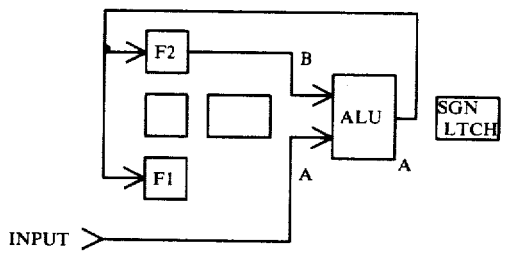
MU:
OU:
STU:
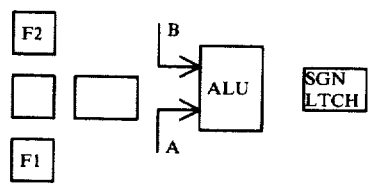
MU:
OU:
STU:
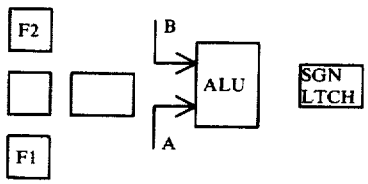
MU:
OU:
STU:
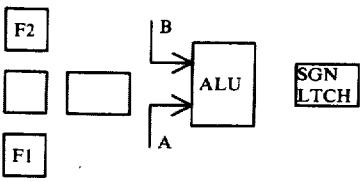
MU:
OU:
STU:
---
Configuration Of Output Unit.
TO INSTR. DECODER     TO INSTR. DECODER     TO C-ROM
     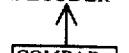     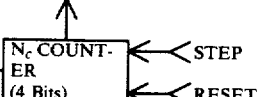 ← STEP
                                                                   ← RESET
FROM K1 PANEL SWITCH     FROM K2 PANEL SWITCH
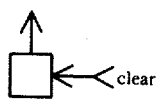 ← clear     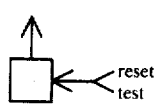 ← reset test

APPENDIX-IIC-continued
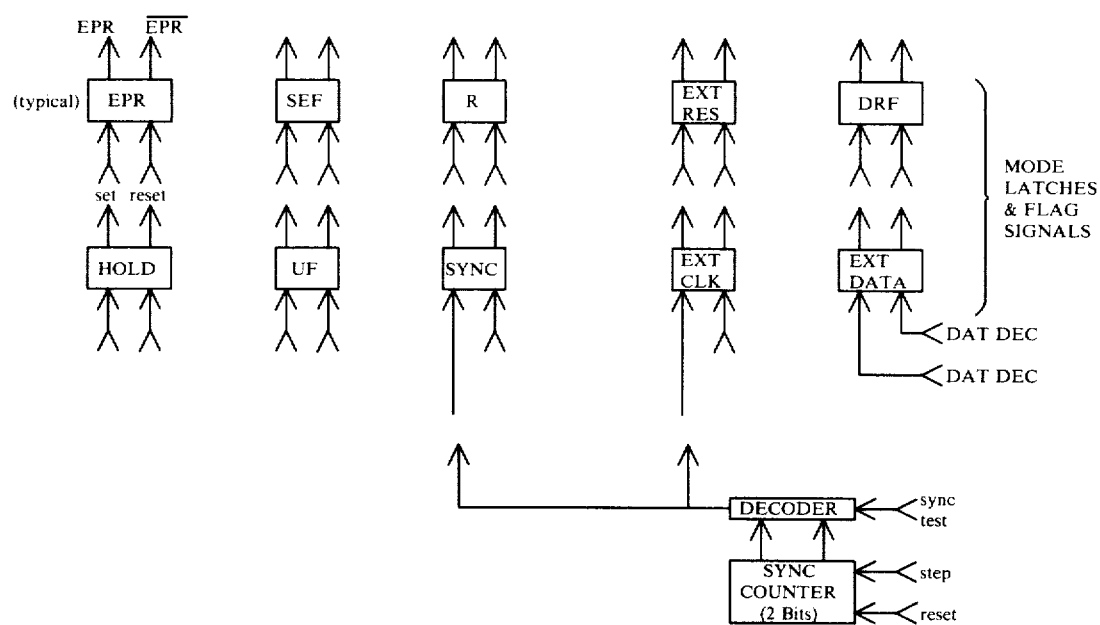
| MODES | FLAGS |
|---|---|
| EXTERNAL RESET | EXT RES = 1 |
| INTERNAL RESET | R = 1 |
| CLEAR LPF MEMORY | EPR = 1 |
| SEARCH | SEF = 1 |
| TRACK | SEF = 0, HOLD = 0 |
| HOLD | SEF = 0, HOLD = 1 |
| TRACKED PAIR VALID | UF = 1 |
| DATA REGENERATE | DRF = 1 |
| MSG BIT START/STOP | SYNC = 1 |
| SEND EXT CLOCK | EXT CLK = 1 |
| SEND EXT DATA | EXT DATA = (MARK/SPACE) DECISION |
Configuration Of Search/Track Unit.
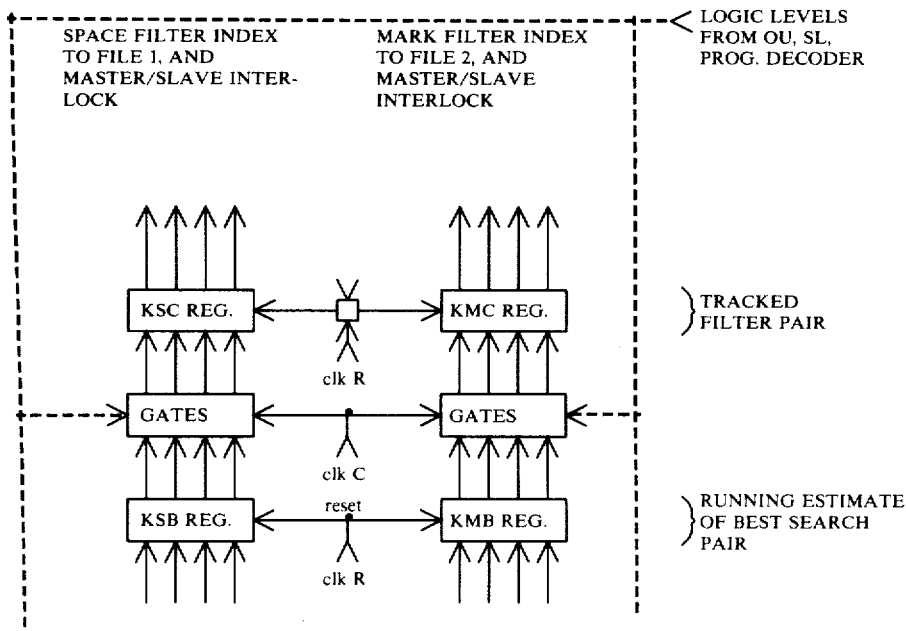

APPENDIX-IIC-continued

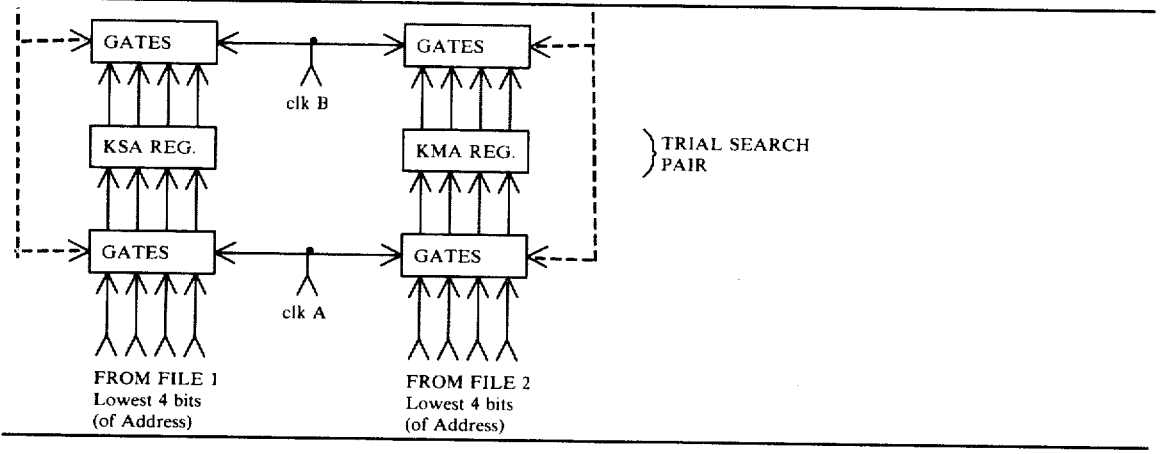

We claim as our invention:

1. A digitally synthesized filter bank detector incorporated in a radio receiver for recovering a communications signal from a received radio signal including said communications signal, comprising in combination:

means for converting said received radio signal to a sequence of multi-bit digital words at a predetermined sampling rate;

first digital processor means coupled to said converting means, being responsive to said sequence of digital words, and operable to multiply the digital words by a desired envelope weighting function representing one of a plurality of substantially like filters sought to be simulated;

second digital processor means coupled to said first digital processor means, being responsive to the envelope-weighted sequence of digital words provided thereby, and operable to multiply the digital words of said envelope-weighted sequence by a constant amplitude center frequency weighting function for each of a plurality of substantially equally spaced center frequencies and to compute the envelope amplitudes of said digital words thereat;

said first and second digital processor digitally implementing thereby a bank of contiguous digital filters having substantially the same shape of frequency response and differing in center frequency over a predetermined frequency bandwidth; and third digital processor means coupled to said second digital processor means, being responsive to the envelope and center frequency weighted sequence of digital words, and being operable to demodulate said sequence and provide a digital representation of said communications signal which is then adapted to be decoded and displayed by said radio receiver.

2. The digitally synthesized filter bank detector as defined by claim 1 wherein said converting means is adapted to receive an IF signal from said radio receiver and includes:

means for translating said IF signal to a lower intermediate frequency, a sample and hold circuit coupled to said lower intermediate frequency signal and an analog to digital converter circuit coupled to said sample and hold circuit, said sample and hold circuit providing a time quantizing function and said A/D converter providing an amplitude quantizing function of said sequence of multi-bit digital words.

3. The digitally synthesized filter bank detector as defined by claim 1 wherein sadi first digital processor means includes a dual multi-word input buffer and a recirculating shift register coupled thereto for performing a time compression on the digital word sequence from said converting means, a read-only memory programmed with binary information conprising a plurality of values of a time-domain weighting function, a digital multipliercoupled to a read-only memory and the recirculating shift register for multiplying the time-compressed sequence of digital words with successive values of the weighting function thereby providing a sequence of digital words weighten by said envelope weighting function, and means for outputting said envelope-weighted sequence to said second digital processor means.

4. The digitally synthesized filter bank detector as defined by claim 3 wherein said read-only memory is programmed with multiple samples of a time domain weighting function approximating a sin x/x pattern where the width of the main lobe thereof corresponds roughly to one half of a message bit period of said sequence of digital words.

5. The digitally synthesized filter bank detector as defined by claim 4 and additionally including an output accumulator coupled between said multiplier circuit and said second digital processor means.

6. The digitally synthesized filter bank detector as defined by claim 1 wherein said second digital processor means comprises a stored program digital computer having a memory programmed with binary information for effecting a modified fast Fourier transform algorithm and a successive phase approximation algorithm for respectively multiplying said digital words by constant amplitude center frequency wave functions and then computing the envelope amplitudes of said digital words.

7. The digitally synthesized filter bank detector as defined by claim 6 wherein said second digital processor means includes a first read-only memory programmed with a stored program consisting of a repertoire of different type instructions, a pair of random access memories, a second read-only memory having trigonometric constants stored therein and adapted to be coupled to the output of one of said random access memories, a pair of arithmetic logic units and scaler means selectively coupled intermediate said random access memories, whereby during a typical program step effected by one or more of said instructions, two multi-bit data words are extracted from the random access memories, one of them is multiplied by a predetermined trigonometric constant from said second read only memory, the two data words are then scaled by a predetermined coefficient by said scaler means and sum and difference data words are computed in a pair of arithmetic logic units with results being written back into the original random access memories.

8. The digitally synthesized filter bank as defined by claim 1 wherein said second digital processor means includes:

means for implementing a 48-point modified fast Fourier transform algorithm for computing in-phase components $I_k$ and quadrature phase components $Q_k$ at a frequency k according to the following expressions:

$$I_k = \frac{1}{32} \sum_{l=0}^{47} f_l \cos \frac{2\pi kl}{48}, \text{ and}$$

$$Q_k = \frac{1}{32} \sum_{l=0}^{47} f_l \sin \frac{2\pi kl}{48}$$

wherein $f_l$ is the envelope-weighted sequence coupled from said first digital processor means, l is equal to a number between 0 and 47 of the 48 point transform; and means for implementing a successive phase approximation algorithm for computing envelope amplitude values $E_k$ at each frequency k according to the expression:

$$E_k = I_k \cos \phi_k + Q_k \sin \phi_k$$

where $\phi_k = \tan^{-1}(Q_k/I_k)$.

9. The digitally synthesized filter bank detector as defined by claim 1 wherein said third digital processor means additionally includes means operable to provide adaptive clipping and threshold logic functions for each filter of said bank of contiguous filters and to provide a search/track logic function thereto to identify a valid filter pair.

10. The digitally synthesized filter bank detector as defined by claim 1 wherein said third digital processor means comprises a post-detection processor including a first read-only memory programmed with a stored program consisting of a repertoire of different type instructions, a single arithmetic logic unit, a pair of random access memories selectively coupled thereto in accordance with a decoded instruction outputted from said first read-only memory, a second read-only memory and a multiplier coupled to the output of one of said random access memories in accordance with a predetermined decoded instruction, a scaling circuit coupled to the output of said first random access memory, electronic switch means coupling said multiplier and scaling means and said second random access memory to said arithmetic logic unit, a scaling and clip circuit coupled to said last mentioned switch means in accordance with decoded instructions from said first read-only memory to provide two lowpass filter algorithms, a search/track algorithm, and demodulator and data regenerator algorithms.

* * * * *